US011739216B2

(12) United States Patent
Jiang et al.

(10) Patent No.: US 11,739,216 B2
(45) Date of Patent: Aug. 29, 2023

(54) BIODEGRADABLE PROTEIN-BASED PLASTICS WITH IMPROVED MECHANICAL STRENGTH AND WATER RESISTANCE

(71) Applicant: NDSU RESEARCH FOUNDATION, Fargo, ND (US)

(72) Inventors: Long Jiang, Fargo, ND (US); Qian Ma, Fargo, ND (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 349 days.

(21) Appl. No.: 17/247,246

(22) Filed: Dec. 4, 2020

(65) Prior Publication Data

US 2021/0171773 A1 Jun. 10, 2021

Related U.S. Application Data

(60) Provisional application No. 62/943,351, filed on Dec. 4, 2019.

(51) Int. Cl.
| | | |
|---|---|---|
| *C08K 5/07* | (2006.01) | |
| *C08L 89/00* | (2006.01) | |
| *C08K 5/00* | (2006.01) | |
| *B33Y 70/00* | (2020.01) | |
| *B33Y 80/00* | (2015.01) | |
| *B33Y 10/00* | (2015.01) | |

(52) U.S. Cl.
CPC ............ *C08L 89/00* (2013.01); *C08K 5/0016* (2013.01); *C08K 5/0025* (2013.01); *C08K 5/07* (2013.01); *B33Y 10/00* (2014.12); *B33Y 70/00* (2014.12); *B33Y 80/00* (2014.12); *C08K 2201/011* (2013.01); *C08L 2201/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,426,140 | A | * | 6/1995 | Fekete .................... E01C 7/147 525/329.9 |
| 5,523,293 | A | | 6/1996 | Jane et al. |
| 6,365,650 | B1 | | 4/2002 | Chen et al. |
| 6,821,331 | B2 | | 11/2004 | Damodaran |
| 7,081,159 | B2 | | 7/2006 | Thames et al. |

(Continued)

FOREIGN PATENT DOCUMENTS

| | | |
|---|---|---|
| WO | 2016176444 A1 | 11/2016 |
| WO | 2017020159 A1 | 2/2017 |

OTHER PUBLICATIONS

Google scholar—methacrylated soy protein (Year: 2023).*

(Continued)

*Primary Examiner* — Peter A Salamon
(74) *Attorney, Agent, or Firm* — McKee, Voorhees & Sease, PLC

(57) ABSTRACT

The present disclosure describes protein-based resin compositions. In particular, the compositions employ methacrylated or acrylated protein, a strengthening agent, a plasticizer, and an initiator. The protein-based resin compositions may be used for making solid articles that are biodegradable and possess a high degree of tensile strength and water resistance. Methods of preparing the biodegradable protein-based plastic articles are also disclosed.

20 Claims, 17 Drawing Sheets

(56) References Cited

U.S. PATENT DOCUMENTS

| | | | |
|---|---|---|---|
| 7,087,659 B2 | 8/2006 | Chisholm et al. | |
| 7,396,875 B2 | 7/2008 | Lockhart et al. | |
| 7,416,598 B2* | 8/2008 | Sun | C09J 189/00 |
| | | | 106/156.2 |
| 8,083,820 B2 | 12/2011 | Kollodge et al. | |
| 9,493,617 B2 | 11/2016 | Zhang et al. | |
| 9,493,693 B2 | 11/2016 | Li | |
| 9,873,823 B2 | 1/2018 | Parker et al. | |
| 2004/0089418 A1* | 5/2004 | Li | B27N 3/002 |
| | | | 156/296 |
| 2005/0166796 A1* | 8/2005 | Sun | C09J 189/00 |
| | | | 106/156.1 |
| 2005/0282988 A1* | 12/2005 | Li | C09J 5/00 |
| | | | 527/200 |
| 2007/0218307 A1* | 9/2007 | Li | C09J 5/00 |
| | | | 156/336 |
| 2008/0090939 A1 | 4/2008 | Netravali et al. | |
| 2009/0000508 A1 | 1/2009 | Edison et al. | |
| 2009/0215619 A1* | 8/2009 | Benecke | A61L 15/60 |
| | | | 502/403 |
| 2010/0272940 A1 | 10/2010 | Shi et al. | |
| 2011/0229698 A1 | 9/2011 | Rasmussen et al. | |
| 2015/0329663 A1* | 11/2015 | Zhang | A61L 15/60 |
| | | | 526/199 |
| 2018/0250204 A1* | 9/2018 | Sasaki | A61K 8/645 |

OTHER PUBLICATIONS

Google scholar—methacrylate soy protein (Year: 2023).*

Schuurman et al., "Gelatin-Methacrylamide Hydrogels as Potential Biomaterials for Fabrication of Tissue-Engineered Cartilage Constructs", Macromolecular Bioscience, vol. 13, pp. 551-561, 2013.

Sethi et al., "Water resistant nanopapers prepared by lactic acid modified cellulose nanofibers", Cellulose, vol. 25, pp. 259-268, 2018.

Shin et al., "The mechanical properties and cytotoxicity of cell-laden double-network hydrogels based on photocrosslinkable gelatin and gellan gum biomacromolecules", Biomaterials, vol. 33, pp. 3143-3152, 2012.

Sim et al., "ATR-FTIR studies on ion interaction of lithium perchlorate in polyacrylate/poly(ethylene oxide) blends", Spectrochimica Acta Part A, vol. 76, pp. 287-292, 2010.

Simsek et al., "Insoluble poly(ethylene oxide) nanofibrous coating materials: effects of crosslinking conditions on the matrix stability", J Polym Res, vol. 23, pp. 1-10, 2016.

Song et al., "One-pot synthesis of soy protein (SP)-poly(acrylic acid) (PAA) superabsorbent hydrogels via facile preparation of SP macromonomer" Industrial Crops and Products, vol. 100, pp. 117-125, 2017.

Steindl et al., "Silane-Acrylate Chemistry for Regulating Network Formation in Radical Photopolymerization", Macromolecules, vol. 50, pp. 7448-7457, Sep. 18, 2017.

Tao et al., "Covalent modification of soy protein isolate by (-)-epigallocatechin-3-gallate: effects on structural and emulsifying properties", J Sci Food Agric, vol. 98, pp. 5683-5689, May 7, 2018.

Teong et al., "The stiffness of a crosslinked hyaluronan hydrogel affects its chondro-induction activity on hADSCs", Journal of Biomedical Materials Research B: Applied Biomaterials, vol. 106B, Issue 2, pp. 808-816, Feb. 2018.

Tian et al., "Fabrication, properties and applications of soy-protein-based materials: A review", International Journal of Biological Macromolecules, vol. 120, pp. 475-490, 2018.

Uzcategui et al., "Understanding and Improving Mechanical Properties in 3D printed Parts Using a Dual-Cure Acrylate-Based Resin for Stereolithography", Advanced Engineering Materials, vol. 20, pp. 1-10, 2018.

Verbeek et al., "Extrusion Processing and Properties of Protein-Based Thermoplastics", Macromolecular Materials and Engineering, vol. 295, pp. 10-21, 2010.

Veira et al., "Natural-based plasticizers and biopolymer films: A review", European Polymer Journal, vol. 47, pp. 254-263, 2011.

Wang et al., "Bio-inspired cellulose nanofiber-reinforced soy protein resin adhesives with dopamine-induced codeposition of "water resistant" interphases", Applied Surface Science, vol. 478, pp. 441-450, 2019.

Wang et al., "Fabrication of soybean protein-acrylate composite mini-emulsion toward wood adhesive", Eur. J. Wood Prod., vol. 76, pp. 305-313, 2018.

Wang et al., "Preparation and Characterization of All-Biomass Soy Protein Isolate-Based Films Enhanced by Epoxy Castor Oil Acid Sodium and Hydroxypropyl Cellulose", Materials, vol. 9, No. 193, pp. 1-11, 2016.

Xiang et al., "Biochar decorated with gold nanoparticles for electrochemical sensing application", Electrochimica Acta, vol. 261, pp. 464-473, 2018.

Xie et al., "Roles of Soft Segment Length in Structure and Property of Soy Protein Isolate/Waterborne Polyurethane Blend Films", Industrial & Engineering Chemistry Research, vol. 55, pp. 1229-1235, 2016.

Xu et al., "Cellulose Nanocrystals vs. Cellulose Nanofibrils: A Comparative Study on Their Microstructures and Effects as Polymer Reinforcing Agents", ACS Applied Materials & Interfaces, vol. 5, pp. 2999-3009, 2013.

Yang et al., "Robust soy protein films obtained by slight chemical modification of polypeptide chains", Polymer Chemistry, vol. 4, pp. 5425-5431, 2013.

Yao et al., "Photoinitiated Crosslinking of Ethylene-Vinyl Acetate Copolymers and Characterization of Related Properties", Polymer Engineering and Science, pp. 1761-1767, 2007.

Ye et al., "Bio-based films with improved water resistance derived from soy protein isolate and stearic acid via bioconjugation", Journal of Cleaner Production, vol. 214, pp. 125-131, 2019.

Yu et al., "Highly functional methacrylated bio-based resins for UV-curable coatings", Progress in Organic Coatings, vol. 122, pp. 219-228, 2018.

Zhang et al., "Soy protein isolate-based films reinforced by surface modified cellulose nanocrystal", Industrial Crops and Products, vol. 80, pp. 207-213, 2016.

Zhao et al., "High bonding strength and boiling water resistance of soy protein-based adhesives via organosilicon-acrylate microemulsion and epoxy synergistic interfacial enhancement", Journal of Applied Polymer Science, pp. 1-8, 2018.

Zhao et al., "Preparation and demonstration of poly(dopamine)-triggered attapulgite-anchored polyurethane as a high-performance rod-like elastomer to reinforce soy protein-isolated composites", Applied Surface Science, vol. 442, pp. 537-546, 2018.

Zhao et al., "Epichlorohydrin-Cross-linked Hydroxyethyl Cellulose/Soy Protein Isolate Composite Films as Biocompatible and Biodegradable Implants for Tissue Engineering", ACS Applied Matierals & Interfaces, vol. 8, pp. 2781-2795, Jan. 7, 2016.

Zheng et al., "Mechanical and moisture sensitivity of fully bio-based dialdehyde carboxymethyl cellulose cross-linked soy protein isolate films", Carbohydrate Polymers, vol. 157, pp. 1333-1340, 2017.

Zhou et al., "Heavy metal ions and organic dyes removal from water by cellulose modified with maleic and anhydride", J Mater Sci, vol. 47, pp. 5019-5029, 2012.

Zubair et al., "Recent advances in protein derived bionanocomposites for food packaging applications", Critical Reviews in Food Science and Nutrition, vol. 60, No. 3, pp. 406-434, 2020.

Adilah et al., "Storage stability of soy protein isolate films incorporated with mango kernel extract at different temperature", Food Hydrocolloids, vol. 87, pp. 541-549, 2019.

Aydogdu et al., "Nanostructured poly(lactic acid)/soy protein/HPMC films by electrospinning for potential applications in food industry", European Polymer Journal, vol. 112, pp. 477-486, 2019.

Baiardo et al., "Surface Chemical Modification of Natural Cellulose Fibers", Journal of Applied Polymer Science, vol. 83, pp. 38-45, Apr. 4, 2001.

Bessonov et al., "Photocurable Hydrogels Containing Spidroin or Fibroin", Moscow University Biological Sciences Bulletin, vol. 73, No. 1, pp. 24-27, 2018.

(56) References Cited

OTHER PUBLICATIONS

Cheng et al., "Acid-degradable lactobionic acid-modified soy protein nanogels crosslinked by ortho ester linkage for efficient anti-tumor in vivo", European Journal of Pharmaceutics and Biopharmaceutics, vol. 128, pp. 247-258, 2018.
Coltelli et al., "State of the Art in the Development and Properties of Protein-Based Films and Coatings and Their Applicability to Cellulose Based Products: An Extensive Review", Coatings, vol. 6, No. 1, 59 pages, 2016.
Cui et al., "3D Printing of a Dual-Curing Resin with Cationic Curable Vegetable Oil", Industrial & Engineering Chemistry Research, vol. 59, pp. 11381-11388, Jun. 12, 2020.
Dobrucka, Renata, "Bioplastic Packaging Materials in Circular Economy", LogForum, vol. 15 (1), pp. 129-137, 2019.
Dong, et al., "Effects of curing conditions on structural evolution and mechanical properties of UV-curable polyurethane acrylate coatings", Progress in Organic Coatings, vol. 114, pp. 58-67, 2018.
Eslah et al., "Preparation and development of a chemically modified bio-adhesive derived from soybean flour protein". International Journal of Adhesion & Adhesive, vol. 71, pp. 48-54, 2016.
Fang et al., "Toughening epoxy acrylate with polyurethane acrylates and hyper-branched polyester in three dimensional printing", Materials Research Express, vol. 5, pp. 1-10, 2018.
Fenn et al., "Visible Light Crosslinking of Methacrylated Hyaluronan Hydrogels for Injectable Tissue Repair", J Biomed Mater Res B Appl Biomater, vol. 104 (6), pp. 1229-1236, Aug. 1, 2016.
Galus et al., "Gas Barrier and Wetting Properties of Whey Protein Isolate-Based Emulsion Films", Polymer Engineering & Science, pp. E375-E383, 2019.
Garrido et al., "Valorization of soya by-products for sustainable packaging", Journal of Cleaner Production, vol. 64, pp. 228-233, 2014.
Garrido et al., "Tailoring soy protein film properties by selecting casting or compression as processing methods", European Polymer Journal, vol. 85, pp. 499-507, 2016.
Ge et al., "Developing acrylated epoxidized soybean oil coating for improving moisture sensitivity and permeability of starch-based film", International Journal of Biological Macromolecules, vol. 125, pp. 370-375, 2019.
Ghadikolaei et al., "Influences of modified bacterial cellulose nanofibers (BCNs) on structural, thermophysical, optical, and barrier properties of poly-ethylene-co-vinyl acetate (EVA) nanocomposite", International Journal of Biological Macromolecules, vol. 115, pp. 266-272, 2018.
Gonzalez et al., "Preparation and characterization of soy protein films reinforced with cellulose nanofibers obtained from soybean by-products", Food Hydrocolloids, vol. 89, pp. 758-764, 2019.
Guit et al., "Photopolymer Resins with Biobased Methacrylates Based on Soybean Oil for Stereolithography", ACS Applied Polymer Materials, vol. 2, pp. 949-957, 2020.
Hamcerencu et al., "Synthesis and characterization of new unsaturated esters of Gellan Gum", Carbohydrate Polymers, vol. 71, pp. 92-100, 2008.
Han et al., "Preparation and characterization of antioxidant soy protein isolate films incorporating licorice residue extract". Food Hydrocolloids, vol. 75, pp. 13-21, 2018.
Han et al., "Soy protein isolate nanocomposites reinforced with nanocellulose isolated from licorice residue: Water sensitivity and mechanical strength", Industrial Crops & Products, vol. 117, pp. 252-259, 2018.
Hassan et al., "Recent Advances on polysaccharides, lipids and protein based edible films and coatings: A review", International Journal of Biological Macromolecules, vol. 109, pp. 1095-1107, 2018.
Hernandez-Izquierdo et al., "Thermoplastic Processing of Proteins for Film Formation—A Review", Journal of Food Science, vol. 73, No. 2, pp. R30-R39, 2008.
Hokkanen et al., "A review on modification methods to cellulose-based adsorbents to improve adsorption capacity", Water Research, vol. 91, pp. 156-173, 2016.
Hu et al., "Improving the properties of starch-based antimicrobial composite films using ZnO-chitosan nanoparticles", Carbohydrate Polymers, vol. 210, pp. 204-209, 2019.
Kang et al., "High-Performance and Fully Renewable Soy Protein Isolate-Based Film from Microcrystalline Cellulose via Bio-Inspired Poly(dopamine) Surface Modification", ACS Sustainable Chemistry & Engineering, vol. 4, pp. 4354-4360, Jun. 15, 2016.
Karan et al., "Green Bioplastics as Part of a Circular Bioeconomy", Trends in Plant Science, 13 pages, Mar. 2019.
Li et al., "Development of green waterborne UV-curable vegetable oil-based urethane acrylate pigment prints adhesive: Preparation and application", Journal of Cleaner Production, vol. 180, pp. 272-279, 2018.
Li et al., "Preparation and characterization of soy protein films with a durable water resistance-adjustable and antimicrobial surface", Materials Science and Engineering C, vol. 69, pp. 947-955, 2016.
Li et al., "A High-Performance Soy Protein Isolate-Based Nanocomposite Film Modified with Microcrystalline Cellulose and Cu and Zn Nanoclusters", Polymers, vol. 9, No. 167, pp. 1-12, 2017.
Li et al., "Carbon nanoparticles/soy protein isolate bio-films with excellent mechanical and water barrier properties", Industrial Crops and Products, vol. 82, pp. 133-140, 2016.
Li et al., "Facile preparation of reactive hydrophobic cellulose nanofibril film for reducing water vapor permeability (WVP) in packaging applications", Cellulose vol. 26, pp. 3271-3284, 2019.
Lin et al., "Thiol-Norbomene Photoclick Hydrogels for Tissue Engineering Applications", Journal of Applied Polymer Science, pp. 1-11, 2015.
Liu et al., "Development and characterization of adhesives from soy protein for bonding wood", International Journal of Adhesion & Adhesives, vol. 27, pp. 59-67, 2007.
Liu et al., "Thiol-branched graphene oxide and polydopamine-induced nanofibrillated cellulose to strengthen protein-based nanocomposite films", Cellulose, vol. 26, pp. 7223-7236, 2019.
Ma et al., "UV-Curable Cellulose Nanofiber-Reinforced Soy Protein Resins for 3D Printing and Conventional Molding", ACS Applied Polymer Materials, vol. 2, pp. 4666-4676, Sep. 9, 2020.
Mhanna et al., "Photopolymerizable Synthons from Glycerol Derivatives", J Am Oil Chem Soc., vol. 91, pp. 337-348, 2014.
Wihodo et al., "Physical and chemical methods used to enhance the structure and mechanical properties of protein films: A review", Journal of Food Engineering, vol. 114, pp. 292-302, 2013.
Naeem et al., "A Novel In Situ Self-Assembling Fabrication Method for Bacterial Cellulose-Electrospun Nanofiber Hybrid Structures", Polymers, vol. 10, No. 712, pp. 1-16, Jun. 11, 2018.
Ortiz et al., "Microfibrillated cellulose addition improved the physicochemical and bioactive properties of biodegradable films based on soy protein and clove essential oil", Food Hydrocolloids, vol. 79, pp. 416-427, 2018.
Park et al., "Synthesis and characterization of UV-curable acrylic resin containing fluorine groups", Polymer International, vol. 54, pp. 705-709, 2005.
Ren et al., "Preparation and properties of ultraviolet/thermal dual-curable polyurethane acrylate", International Journal of Adhesion & Adhesives, vol. 99, pp. 1-6, 2020.
Rodionova et al., "Surface chemical modification of microfibrillated cellulose: improvement of barrier properties for packaging applications", Cellulose, vol. 18, pp. 127-134, 2011.
Rosilo et al., "Transition to Reinforced State by Percolating Domains of Intercalated Brush-Modified Cellulose Nanocrystals and Poly(butadiene) in Cross-Linked Composites Based on Thiol-ene Click Chemistry", Biomacromolecules, vol. 14, pp. 1547-1554, Mar. 18, 2013.
Rostamzad et al., "Improvement of fish protein film with nanoclay and transglutaminase for food packaging", Food Packaging and Shelf Life, vol. 7, pp. 1-7, 2016.
Sahlin et al., "Surface treatment of cellulose nanocrystals (CNC): effects on dispersion rheology", Cellulose, vol. 25, pp. 331-345, 2018.
Salari et al., "Development and evaluation of chitosan based active nanocomposite films containing bacterial cellulose nanocrystals and silver nanoparticles", Food Hydrocolloids, vol. 84, pp. 414-423, 2018.

(56) References Cited

OTHER PUBLICATIONS

Salih et al., "Synthesis of Radiation Curable Palm Oil-Based Epoxy Acrylate: NMR and FTIR Spectroscopic Investigations", Molecules, vol. 20, pp. 14191-14211, Aug. 4, 2015.

* cited by examiner

BIODEGRADABLE PROTEIN-BASED PLASTICS WITH IMPROVED MECHANICAL STRENGTH AND WATER RESISTANCE

CROSS REFERENCE TO RELATED APPLICATIONS

This application claims priority to provisional application U.S. Ser. No. 62/943,351, filed Dec. 4, 2019, which is incorporated herein by reference in its entirety.

TECHNICAL FIELD

The present invention relates to biodegradable protein-based compositions, and, more particularly, to biodegradable protein-based compositions containing modified soy protein in combination with nanomaterial reinforcements.

BACKGROUND

Naturally occurring biopolymers offer great potential for replacing the petroleum polymers in many applications. Furthermore, the use of biopolymers derived from biomass can add value to many agricultural and forest byproducts and thus provide important economic benefits to the respective industries. Many biopolymers such as proteins (soy protein, wheat gluten, kidney bean protein, whey, collagen, and gelatin), polysaccharides (cellulose, starch, lignin, alginate, gum, and chitosan), lipids (waxes and paraffin), or the combination of these components have been investigated as materials that can offer competitive properties, especially in their modified forms. Among these biomaterials, proteins are a favorable source for developing biodegradable plastics because many of the nonpolar, polar, and charged amino acids in protein chains provide functional sites for modification and thus impart protein-based materials improved physical properties in comparison to polysaccharides and lipids.

Soy protein isolate (SPI), as a common soy protein material and a byproduct from the soybean oil industry, contains a minimum of 90% protein and consists of 18 different amino acids. Owing to its good film-forming ability, low cost, and desirable transparency, SPI has attracted considerable research interest in bioplastics application. However, some fundamental limitations of SPI, such as poor processability and flexibility, insufficient mechanical strength, and low water resistance, have prevented it from widespread uses. The limitations arise from strong intra- and intermolecular interactions among protein chains and the hydrophilic functional groups on the chains. To overcome these problems, many different physical or chemical modification methods, such as heating, microwaving, ultrasonic treatment, pH adjustment, hydrolysis, blending, grafting, cross-linking, or incorporation of nano reinforcements, have been attempted to alter its native coiled protein structure.

SPI has been blended with hydrophobic thermoplastics, such as poly (lactic acid) (PLA) and poly (butylene adipate-co-terephthalate) (PBAT), and fatty acid and lipids, such as oleic acid/steric acid, epoxidized soybean oil, and olive oil, to reduce its water sensitivity. Small-molecular-weight plasticizers such as glycerol, ethylene glycol, and propylene glycol have also often been incorporated into SPI to improve its processability and flexibility. However, these attempts to improve one specific property of SPI often lead to decreases in other properties. Grafting new functional groups onto soy protein chains is another method to improve the performance of SPI plastics or to expand their functions. Various chemical agents have been employed to modify SPI for better or new properties. Nevertheless, in spite of many physical and chemical modifications attempted on SPI, its drawbacks, such as low mechanical strength and poor water-resistance, still pose a significant challenge for its wider use.

Incorporation of nano reinforcements is another promising method to obtain flexible protein-based plastics with significantly improved properties. Bio-based films based on modified SPI, composite films of SPI blended with various biodegradable polymers or reinforced by different nanoparticles, including cellulose nanofibers (CNF), have been previously studied for different applications. Unfortunately, it is still challenging to incorporate CNF in hydrophobic polymers for reinforcement because of weak fiber-polymer interfacial bonding and poor dispersion of the nanofibers in the polymer matrixes. Additionally, the strong hydrophilic nature of cellulose leads to poor water resistance of the products and thus hinders its use in plastic applications.

BRIEF SUMMARY OF PREFERRED EMBODIMENTS

A preferred embodiment includes biodegradable protein-based resin compositions. Preferably, the compositions comprise methacrylated or acrylated protein, a strengthening agent, a plasticizer, and an initiator.

In some embodiments, the protein is soy protein selected from soy flour, soy protein concentrate, soy protein isolate, or a mixture thereof. Preferably, the protein is soy protein isolate. In some embodiments, the strengthening agent comprises one or more nanomaterials. In some embodiments, the strengthening agent is selected from nanocellulose, carbon fiber, graphene, glass fiber, carbon nanotubes, zinc oxide, titanium dioxide, layered silicates, and nanoclay, or methacrylated or acrylated derivatives thereof. Preferably, the strengthening agent comprises a nanocellulose. Preferably, the strengthening agent comprises a methacrylated or acrylated nanocellulose. In some embodiments, the composition further comprises a crosslinking agent. Preferably, the crosslinking agent comprises one or more acrylate or methacrylate groups. Preferably, the plasticizer comprises glycerol, polyethylene oxide, or acrylated-epoxidized soybean oil. In some embodiments, the initiator comprises a photoinitiator or a thermal initiator. Preferably, the photoinitiator comprises 2-hydroxy-2-methylpropiophenone. Preferably, the composition is UV and/or thermal curable. In some embodiments, the composition further comprises one of more additives.

A preferred embodiment includes solid biodegradable articles formed from any of the aforementioned protein-based resin compositions. In some embodiments, the article is formed by injection molding, extrusion molding, or 3D printing.

For any of the aforementioned embodiments, the compositions according to the present disclosure can be heated or exposed to light for a sufficient time to cure the composition.

A preferred embodiment includes methods of preparing a biodegradable protein-based plastic composition. Preferably, the methods comprise combining methacrylated or acrylated protein, a strengthening agent, a plasticizer, and an initiator to form a mixture; and exposing the mixture to UV light and/or heat to cure the composition. In some embodiments, the method further comprises forming a biodegradable article from the mixture.

In some embodiments, the protein is soy protein selected from soy flour, soy protein concentrate, soy protein isolate, or a mixture thereof. Preferably, the protein is soy protein isolate. In some embodiments, the strengthening agent comprises one or more nanomaterials. In some embodiments, the strengthening agent is selected from nanocellulose, carbon fiber, graphene, glass fiber, carbon nanotubes, zinc oxide, titanium dioxide, layered silicates, and nanoclay, or methacrylated or acrylated derivatives thereof. Preferably, the strengthening agent comprises a nanocellulose. Preferably, the strengthening agent comprises a methacrylated or acrylated nanocellulose. In some embodiments, the composition further comprises a crosslinking agent. Preferably, the crosslinking agent comprises one or more acrylate or methacrylate groups. Preferably, the plasticizer comprises glycerol, polyethylene oxide, or acrylated-epoxidized soybean oil. In some embodiments, the initiator comprises a photoinitiator or a thermal initiator. Preferably, the photoinitiator comprises 2-hydroxy-2-methylpropiophenone. In some embodiments, the forming is by injection molding, extrusion molding, or 3D printing.

While multiple embodiments are disclosed, still other embodiments of the inventions will become apparent to those skilled in the art from the following detailed description, which shows and describes illustrative embodiments of the invention. Accordingly, the figures and detailed description are to be regarded as illustrative in nature and not restrictive.

BRIEF DESCRIPTION OF THE FIGURES

The following drawings form part of the specification and are included to further demonstrate certain embodiments or various aspects of the invention. In some instances, embodiments of the invention can be best understood by referring to the accompanying figures in combination with the detailed description presented herein. The description and accompanying figures may highlight a certain specific example, or a certain aspect of the invention. However, one skilled in the art will understand that portions of the example or aspect may be used in combination with other examples or aspects of the invention.

FIG. 5A shows films cured by UV irradiation for 0 min.

FIG. 5B shows films cured by UV irradiation for 2 min. FIG. 5C shows films cured by UV irradiation for 5 min.

FIG. 11A shows MSPI-1 and FIG. 11C shows the sample after 24 hr water immersion. FIG. 11B shows MSPI-2 and FIG. 11D shows the sample after 24 hr water immersion.

DETAILED DESCRIPTION

Figure 1A:
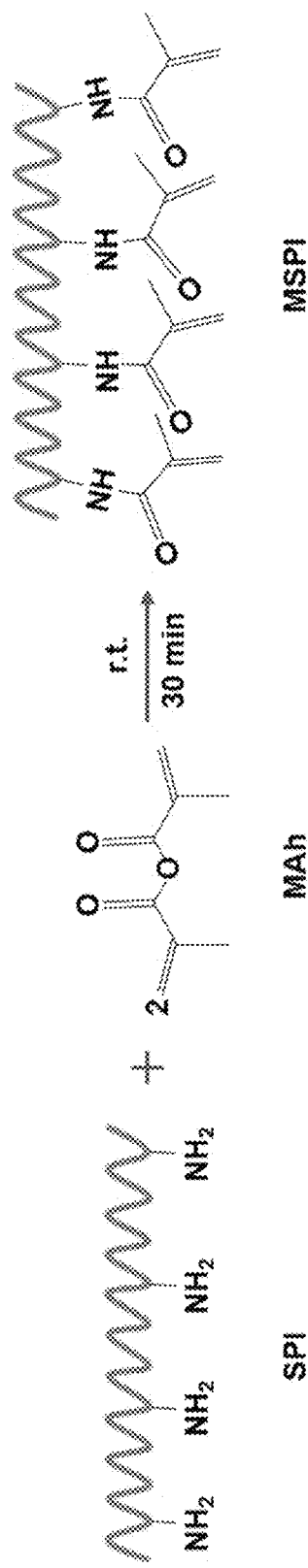
FIG. 1A shows a simplified reaction scheme for MSPI synthesis.

The present disclosure relates to protein-based plastic compositions. The compositions disclosed combine the advantages of photo-crosslinking and nanofiber reinforcement to obtain photocurable bioplastics that exhibit greatly enhanced mechanical strength and water resistance. Surprisingly, Applicants discovered that neither the incorporation of the nanocellulose nor UV curing alone can effectually improve the water resistance of the compositions. However, the synergistic effect of photo-crosslinking and cellulose nanofiber reinforcement provides a novel, facile, and effective method to improve mechanical and water resistance performance. Applicants also discovered either UV curing or thermal curing can effectively cure the soy resin and that a UV/thermal dual-cure method led to the best overall performance. The compositions may be used for making solid articles that are biodegradable and possess a high degree of tensile strength and water resistance that are prepared, for example, by extrusion compounding and injection molding.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

It is to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Similarly, the word "or" is intended to include "and" unless the context clearly indicate otherwise. The word "or" means any one member of a particular list and also includes any combination of members of that list. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

The term "about," as used herein, refers to variation in the numerical quantity that can occur, for example, through typical measuring techniques and equipment, with respect to any quantifiable variable, including, but not limited to, distance, mass, volume, time, temperature, molecular weight, pressure, and wavelength. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. The term "about" also encompasses amounts that differ due to different equilibrium conditions for a composition resulting from a particular initial mixture. Whether or not modified by the term "about," the claims include equivalents to the quantities.

The methods and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

Biodegradable Protein-Based Plastic Compositions

The present disclosure relates to biodegradable protein-based plastic compositions comprising (meth)acrylated protein, a strengthening agent, a plasticizer, and an initiator. The present compositions may be formed into solid articles of varying shapes, sizes and dimensions, that are useful in a variety of applications. Advantageously, products prepared with the composition display improved tensile strength and water resistance over unmodified protein materials. The compositions may be formed into a solid article including, for example a tray, bottle, tubing, dishware such as a cup or a plate, flatware such as a spoon, knife, fork or other eating utensil, or other like articles, a packaging for another article or substance such as foods, drugs and the like. The composition of the invention may also be molded or extruded to provide products such as packaging, loose fills, electronics enclosures, and the like.

The compositions of the invention are useful for providing solid articles that are biodegradable with a high degree of water-resistance, so that the article will remain structurally intact for an extended period of time upon exposure to water. Although the articles made from the composition of the invention will degrade over time when exposed to moisture, such as from the package contents, or from submersion in water or other direct contact with water, the articles have a higher resistance to such disintegration and will remain substantially intact for a more extended period of time than articles made from other protein-based plastics.

Protein Source

The methods and compositions comprise a protein source. Preferably, the protein source is derived from soybean. The soy protein can be in the form of a soy protein isolate containing at least about 90% protein, a soy protein concentrate containing at least about 70% protein, or soy flour containing at least about 50% protein. The soy protein isolate or concentrate can be prepared, for example, by alkaline extraction of a defatted meal and acid precipitation, a technique known and used in the art. Soy protein products are also commercially available, for example, from Archer Daniels Midland Company.

Other suitable plant-derived proteins include, for example, gluten, zein, hordein, kafirin, avenin, sunflower seed protein, cotton seed protein, peanut protein, rapeseed protein, and the like. Animal-derived proteins suitable for use in the present compositions include, for example, casein derived from milk, albumin derived from blood or egg, collagen, gelatin, keratin, and other like protein-containing substances.

The protein is surface modified to improve hydrophobicity and impart reactivity. Preferably, the protein is modified to contain acrylate, methacrylate, or other vinyl containing groups. A number of acrylate, methacrylate, or vinyl group containing chemicals can be used as modifying agents. Examples include methacrylic acid, methacrylic anhydride, 2-hydroxyethyl methacrylate, hydroxypropyl methacrylate, glycidyl methacrylate, acrylic acid, hydroxypropyl acrylate, 10-undecylenoyl chloride, 4-pentenoic acid. The degree of (meth)acrylation of the protein has a significant effect on the mechanical properties of the compositions. Higher (meth)acrylation degree results in higher sample tensile strength.

The (meth)acrylated protein is typically present in an amount of from about 20 wt. % to about 95 wt. %, in some embodiments from about 30 wt. % to about 90 wt. %, and in some embodiments, from about 40 wt. % to about 80 wt. %, based on the total weight of the composition.

Strengthening Agent

The methods and compositions comprise a strengthening agent. The incorporated strengthening agent can provide spaces/pathways to dissipate stress cracks in the polymeric matrix to enhance performance. A number of organic nanofillers (e.g. cellulose nanofibrils or nanocrystals and nanocrystals of zein, chitosan, and starch) and inorganic nanofillers (e.g. nanoclays, layered silicates, zinc oxide, titanium dioxide, silver, and carbon nanotubes) are suitable for use as strengthening agents.

Preferably, the strengthening agent is a nanocellulose or a surface modified nanocellulose. The term "nanocellulose" as used herein refers to nano-sized cellulose obtained from cellulose such as cellulose nanocrystal (CNC), nanofibrillar cellulose (NFC), and cellulose nanofibers (CNF). Nanocellulose is an effective nanoreinforcement material because of its superior mechanical properties, high aspect ratio, and a large number of available methods for chemical modifications of the fiber surface. Cellulose nanofiber is produced by multi-pass high-pressure mechanical fibrillation and homogenization, which creates long, flexible, and often entangled cellulose nanofibrils with a diameter of about 5 nm to about 300 nm, preferably about 10 nm to about 60 nm. The addition of even a very low concentration of well-dispersed cellulose nanofibers in the polymeric matrix can result in strong reinforcing effect.

The nanocellulose can be surface-modified to further improve hydrophobicity and compatibility with the surface-modified protein. In some embodiments, the strengthening agent is a (meth)acrylated nanocellulose.

The strengthening agent is typically employed in an amount of from about 1 wt. % to about 30 wt. %, in some embodiments from about 2 wt. % to about 20 wt. %, and in some embodiments, from about 5 wt. % to about 15 wt. %, based on the weight of the protein employed in the composition. Likewise, the strengthening agent may also constitute from about 0.1 wt. % to about 20 wt. %, in some embodiments from about 1 wt. % to about 15 wt. %, and in some embodiments, from about 2 wt. % to about 10 wt. %, based on the total weight of the composition.

Photoinitiator

Crosslinking is a particularly effective approach for the development of protein-based plastics with improved mechanical strength and water barrier properties because it can create intermolecular chemical bonding, increase molecular packing, and reduce polymer chain mobility, thus improving the overall properties of the films. Proteins can be crosslinked thermally, enzymatically, chemically, or through photopolymerization. Many of these methods involve either the use of toxic crosslinking agents or considerable amount of time and energy for polymer network formation. Photopolymerization, also known as photo-crosslinking or UV curing, is a process that transforms multifunctional monomers into a crosslinked polymer network through a chain reaction initiated by free radicals, which are produced by an added photoinitiator under UV irradiation. The major advantages of photo-crosslinking over traditional crosslinking methods include low equipment costs, low energy consumption, short crosslinking time, low environmental impact, and excellent mechanical properties.

The methods and compositions may comprise a photoinitiator. The photoinitiator may include any suitable structure capable of absorbing light (e.g., UV, visible light) emitted by the activation energy source and, in response, promoting the polymerization of the composition. Examples of suitable photoinitiators include 2-benzyl-2-(dimethylamino)-4'-morpholinobutyrophenone; 2-hydroxy-2-methylpropiophenone; trimethylbenzophenone; methylbenzophenone; 1-hydroxy-cyclohexylphenyl ketone; isopropyl thioxanthone; 2,2-dimethyl-2-hydroxy-acetophenone; 2,2-dimethoxy-2-phenylacetophenone; 2-methyl-2-[4-(methylthio)phenyl]-2-morpholino-propan-1-one; 2,4,6-trimethylbenzyl-diphenylphosphine oxide; 1-chloro-4-propoxythioxanthone; benzophenone; bis(2,6-dimethoxybenzoyl)-2,4,4-trimethyl pentyl phosphine oxide; 1-phenyl-2-hydroxy-2-methyl propanone; bis(2,4,6-trimethylbenzoyl)phenylphosphine oxide; camphorquinone; and the like. Combinations comprising one or more the foregoing may also be used. Suitable commercially available photoinitiators include, but are not limited to Irgacure 907, Irgacure 819, Irgacure 2959, Irgacure 184, Irgacure 369, Benzophenone, SarCure SR1124 (ITX), Darocur D1173, Irgacure 651, TZT (SarCure SR1137), and combinations thereof. In an exemplary embodiment, the photoinitiator comprises 2-hydroxy-2-methylpropiophenone.

The photoinitiator is typically employed in an amount of from about 1 wt. % to about 20 wt. %, in some embodiments from about 2 wt. % to about 15 wt. %, and in some embodiments, from about 5 wt. % to about 10 wt. %, based on the weight of the (meth)acrylated ingredients employed in the composition. Preferably, photoinitiator is present in an amount of about 8% based on the weight of the (meth)acrylated ingredients employed in the composition. Likewise, the photoinitiator may also constitute from about 0.1 wt. % to about 20 wt. %, in some embodiments from about 1 wt. % to about 15 wt. %, and in some embodiments, from about 2 wt. % to about 8 wt. %, based on the total weight of the composition.

Thermal Initiator

Besides UV curing, thermal curing is another way to improve polymer mechanical performance and is generally done by simply adding a thermal initiator (TI) to a formulation. Thermal curing is commonly used as a post-curing method following UV irradiation to increase the degree of crosslinking and boost the performance of a printed object.

The methods and compositions may comprise a thermal initiator. Exemplary thermal initiators include: azo compounds such as, for example, 2,2-azo-bisisobutyronitrile (AIBN), 2,2'-azobis(2-methylbutyronitrile), azo-2-cyanovaleric acid, dimethyl 2,2'-azobis(isobutyrate), azobis(diphenyl methane), 4,4'-azobis-(4-cyanopentanoic acid), (2,2'-azobis(2,4-dimethylvaleronitrile (available as VAZO™ 52); peroxides such as, for example, benzoyl peroxide, cumyl peroxide, tert-butyl peroxide, cyclohexanone peroxide, glutaric acid peroxide, and dilauryl peroxide; hydrogen peroxide; hydroperoxides such as, for example, tert butyl hydroperoxide, tert-amyl hydroperoxide, and cumene hydroperoxide; peracids such as, for example, peracetic acid and perbenzoic acid; potassium persulfate; and peresters such as, for example, diisopropyl percarbonate. In an exemplary embodiment, the thermal initiator comprises tert-butyl peroxybenzoate.

The thermal initiator may be selected, for example, based on the temperature desired for use of the thermal initiator and compatibility with the curable composition. Combinations of two or more thermal initiators may also be useful.

The thermal initiator is typically employed in an amount of from about 0.5 wt. % to about 20 wt. %, in some embodiments from about 1 wt. % to about 15 wt. %, and in some embodiments, from about 2 wt. % to about 10 wt. %, based on the weight of the (meth)acrylated ingredients employed in the composition. Likewise, the thermal initiator may also constitute from about 0.01 wt. % to about 10 wt. %, in some embodiments from about 0.5 wt. % to about 7.5 wt. %, and in some embodiments, from about 1 wt. % to about 5 wt. %, based on the total weight of the composition.

Plasticizer

The methods and compositions may further comprise a plasticizer. Suitable plasticizers may include, for instance, polyhydric alcohols, such as sugars (e.g., glucose, sucrose, fructose, raffinose, maltodextrose, galactose, xylose, maltose, lactose, mannose, and erythrose), sugar alcohols (e.g., erythritol, xylitol, malitol, mannitol, and sorbitol), polyols (e.g., ethylene glycol, glycerol, propylene glycol, dipropylene glycol, butylene glycol, and hexane triol) and their polymers (e.g., polyethylene glycol, also known as polyethylene oxide (PEO) or polyoxyethylene (POE), polyvinyl alcohol, polyaziridines (e.g., polyethylenimine), polyoxazolines (e.g., poly (2-ethyl-2-oxazoline)), hyperbranched or dendritic polyols, polyamines, and hyperbranched or dendritic polyamines. Preferred plasticizers are polyols and their polymers. In an exemplary embodiment, the plasticizer comprises glycerol or polyethylene oxide (PEO).

The use of some plasticizers offers dual purposes of both plasticizer and crosslinker in the compositions. Dual purpose plasticizers suitable for use in the present compositions include modified vegetable oils (e.g., epoxidized vegetable oil, acrylated vegetable oil, maleated vegetable oil, and acrylated-epoxidized vegetable oil. The vegetable oil may be, for instance, soybean oil. In an exemplary embodiment, the plasticizer comprises acrylated-epoxidized soybean oil (AESO). Acrylated oils can also serve as a crosslinker to improve water resistance and mechanical properties of the composition, particularly in the wet state. The acrylate groups in their molecular structures can react with the C=C bonds of the (meth)acrylated protein during curing.

The plasticizer is typically employed in an amount of from about 20 wt. % to about 80 wt. %, in some embodiments from about 30 wt. % to about 70 wt. %, and in some embodiments, from about 40 wt. % to about 60 wt. %, based on the weight of the protein employed in the composition. Likewise, the plasticizer may also constitute from about 1 wt. % to about 60 wt. %, in some embodiments from about 10 wt. % to about 50 wt. %, and in some embodiments, from about 20 wt. % to about 40 wt. %, based on the total weight of the composition.

Crosslinking Agent

The methods and compositions may comprise a crosslinking agent. Additional crosslinks (e.g. acrylates) can be included in the compositions to tailor water resistance and mechanical properties of the products. Preferably, the crosslinking agent comprises one or more acrylate (or methacrylate) groups. e.g., a diacrylate, triacrylate, or higher acryl containing molecule.

Suitable crosslinking agents may include, for instance, glycerol dimethacrylate (GDMA), glycerol 1,3-diglycerolate diacrylate, 3-(acryloyloxy)-2-hydroxypropyl methacrylate, glycerol propoxylate triacrylate, bisacrylamidoacetic acid, 2,2-bis[4-(2-acryloxyethoxy)phenyl]propane, 2,2-bis(4-methacryloxyphenyl)propane, butanediol diacrylate and dimethacrylate, 1,4-cyclohexanediol diacrylate and dimethacrylate, 1,10-dodecanediol diacrylate and dimethacrylate, 1,4-diacryloylpiperazine, 2,2-dimethylpropanediol diacrylate and dimethacrylate, dipentaerythritol pentaacrylate, dipropylene glycol diacrylate and dimethacrylate, N,N-dodecamethylenebisacrylamide, glycerol trimethacrylate, glycerol tris(acryloxypropyl) ether, N,N'-hexamethylenebisacrylamide, N,N'-octamethylenebisacrylamide, 1,5-pentanediol diacrylate and dimethacrylate, 1,3-phenylenediacrylate, poly(ethylene glycol) diacrylate and dimethacrylate, poly(propylene) diacrylate and dimethacrylate, triethylene glycol diacrylate and dimethacrylate, tripropylene glycol diacrylate or dimethacrylate, N,N'-dimethacryloylpiperazine, ethylene glycol diacrylate, ethylene glycol dimethacrylate, N,N'-methylenebisacrylamide, 1,1,1-trimethylolethane trimethacrylate, 1,1,1-trimethylolpropane triacrylate, 1,1,1-trimethylolpropane trimethacrylate (TRIM-M), vinyl acrylate, 1,6-hexanediol diacrylate and dimethacrylate, 1,3-butylene glycol diacrylate and dimethacrylate, alkoxylated cyclohexane dimethanol diacrylate, alkoxylated hexanediol diacrylate, alkoxylated neopentyl glycol diacrylate, aromatic dimethacrylate, caprolactone modified neopentylglycol hydroxypivalate diacrylate, cyclohexane dimethanol diacrylate and dimethacrylate, ethoxylated bisphenol diacrylate and dimethacrylate, neopentyl glycol diacrylate and dimethacrylate, ethoxylated trimethylolpropane triacrylate, propoxylated trimethylolpropane triacrylate, propoxylated glyceryl triacrylate, pentaerythritol triacrylate, tris (2-hydroxy ethyl)isocyanurate triacrylate, di-trimethylolpropane tetraacrylate, dipentaerythritol pentaacrylate, ethoxylated pentaerythritol tetraacrylate, pentaacrylate ester, pentaerythritol tetraacrylate, caprolactone modified dipentaerythritol hexaacrylate, N,N'-methylenebisacrylamide, diethylene glycol diacrylate and dimethacrylate, trimethylolpropane triacrylate, ethylene glycol diacrylate and dimethacrylate, tetra (ethylene glycol) diacrylate, 1,6-hexanediol diacrylate, divinylbenzene, 1,3-butanediol dimethacrylate, 1,3,5-triacryloylhexahydro-1,3,5-triazine, N,N'-hexamethylenebis(methacrylamide), 2-hydroxyethyl methacrylate (HEMA), acrylated-epoxidized soybean oil (AESO), epoxidized soybean oil methacrylate (ESOMA), acrylated-epoxidized cottonseed oil (AECO), acrylated epoxidized sucrose soyate (AESS), methacrylated epoxidized sucrose soyate (MESS), and dimethacrylated epoxidized sucrose soyate (DEMESS). In an exemplary embodiment, the crosslinking agent comprises glycerol dimethacrylate.

The crosslinking agent is typically employed in an amount of from about 20 wt. % to about 80 wt. %, in some embodiments from about 30 wt. % to about 70 wt. %, and in some embodiments, from about 40 wt. % to about 60 wt. %, based on the weight of the protein employed in the composition. Likewise, the crosslinking agent may also constitute from about 1 wt. % to about 60 wt. %, in some embodiments from about 5 wt. % to about 50 wt. %, and in some embodiments, from about 10 wt. % to about 30 wt. %, based on the total weight of the composition.

Water

The compositions may further include about 1 to about 25 wt. % water to add moisture and facilitate processing of the compositions, preferably about 5 to about 20 wt. %, preferably about 10 to about 15 wt. %.

Additional Additives

The compositions may further include additional additives as desired. Useful additives include, but are not limited to, a lubricating agent, coloring agent, preservatives, among others.

Lubricants

The composition may contain a minor but effective amount of a lubricating agent to provide a mold-or dye-lubricating effect when the composition is molded into the desired article, for example, by aiding in the release of the molded article from the mold. Water-insoluble lubricants may also increase the water-resistance of the products. Examples of suitable lubricants that may be used in the compositions, either alone or in combination with another lubricant, include soybean oil, phospholipids such as lecithin, mono- and diglycerides, and fatty acids, preferably saturated fatty acids; vegetable oil, preferably hydrogenated forms, phosphoric acid-derivatives of the esters of polyhydroxy compounds, animal lipids, preferably hydrogenated forms to prevent thermal oxidation, petroleum silicone and mineral oils, and the like. Preferred lubricants are soybean oil and lecithin. The amount of lubricant included in the composition is from about 0.1 to about 2 wt. %, preferably about 0.5 to about 1.5 wt. %.

Preservatives

A compatible antimicrobial agent such as a fungicide or bactericide may also be included in the composition in an amount effective to prevent growth of fungi, bacteria and the like, in or on the compositions or an article formed from the compositions. Examples of useful preservatives include sodium salts of propionic or sorbic acid, sodium diacetate, parabens, vinegar, monocalcium phosphate, lactic acid, and the like, and mixtures thereof. The composition may include from about 0.05 to about 0.3 wt. % preserving agent.

Colorants

The compositions may further include a coloring agent as desired. Coloring agents, suitable for use in the present compositions include, for example, azo dyes such as Bismarck Brown 2R and Direct Green B; natural coloring agents such as chlorophyll, xanthophyll, carotene, and indigo; and metallic oxides such as iron or titanium oxides. The coloring agent may be included in the composition at a concentration of about 0.01 to about 10 wt. %, preferably about 0.5 to about 3 wt. %.

Preparation of Compositions and Formed Articles

The protein composition ingredients are mixed and exposed to UV light to cure the composition. In some embodiments, the compositions are formed into a desired article according to conventional processing techniques known in the art for preparing molded plastic articles. In some embodiments, the articles are formed by 3D printing.

The mixing system may be a continuous flow mixer such as a Teledyne continuous processor or a Beardsley Piper continuous mixer, and the like, or more preferably, a twin screw extruder apparatus, with a twin-screw extruder being highly preferred, as for example, a multiple section Buhler Miag twin screw extruder, a Brabender type PL 2000 extruder, a Leistritz type ZSE 40 MAXX extruder, and the like. The ingredients are mixed together at high shear to form a substantially homogeneous consistency with the ingredients distributed substantially evenly throughout.

For example, the ingredients may be processed in an extruder by feeding the ingredients into the barrel of the extruder, mixing the ingredients to a plasticized consistency, extruding the mixture through a discharge port or die, and then sectioning the extrudate into pieces. In a preferred method, the ingredients are processed in a twin-screw extruder which has multiple barrel sections with means for mixing the ingredients with varying temperature, pressure and shear, and screws for shearing and conveying the mixture through the extruder to the discharge port. The extrusion conditions, for example, the screw configuration, elements, pitch and speed, the barrel configuration, temperature and pressure, the shear and throughput rate of the mixture, the die hole diameter, feed rate of the ingredients, and other conditions, may be varied in each barrel section as desired to achieve effective mixing of the ingredients to form a substantially homogeneous semi-solid mixture in which the ingredients are distributed evenly throughout.

In the extruder, the action of the rotating screw or screws will mix the ingredients and force the mixture through the sections of the extruder with considerable pressure. A useful extruder for processing the soy protein composition is a Leistritz type ZSE 40 MAXX extruder which has ten heating zones (barrel sections) in which heat can be applied to the ingredient mixture. Some barrel sections are equipped with vacuum ports to remove volatiles from the material (e.g. moisture and gaseous reaction byproducts) and side feed ports to inject more ingredients into the material during the extrusion process. The amount of heat applied is suitable for thorough mixing and reaction of the ingredients. The plastic composition is extruded through the discharge port or die into air or other gaseous medium. The extrudate is then sectioned into pellets of desired size, dried, and either stored for use at a later time or used in an injection molding process to form a biodegradable plastic product. The extruded mixture solidifies within a few minutes, depending, for example, on the size of the extruded portion, the ingredients of the composition, the temperature of the composition, and other like factors.

After mixing, the protein mixture is discharged from the mixing system, and either directly used in a molding system (i.e., injection molding), or allowed to adjust the moisture content for later use. The discharged material (i.e., extrudate) may be sectioned into pellets or other small pieces, and dried. The protein material may be processed into a solid article, for example, by injection molding process wherein an amount of the plastic composition in melted form is forced into a mold and maintained under pressure until cool; by compression molding wherein direct pressure is applied using a hydraulic press on an amount of the composition contained in a cavity; by blow molding wherein a tube of the thermoplastic composition is extruded into a mold and air pressure is applied to the inside of the tube to conform it to the mold and form a hollow article; and by other methods such as, transfer molding, vacuum forming, pressure forming, and inflation molding, or other suitable molding technique. The formed articles are exposed to light and/or heat to improve mechanical strength and water resistance.

EXAMPLES

Figure 1B:
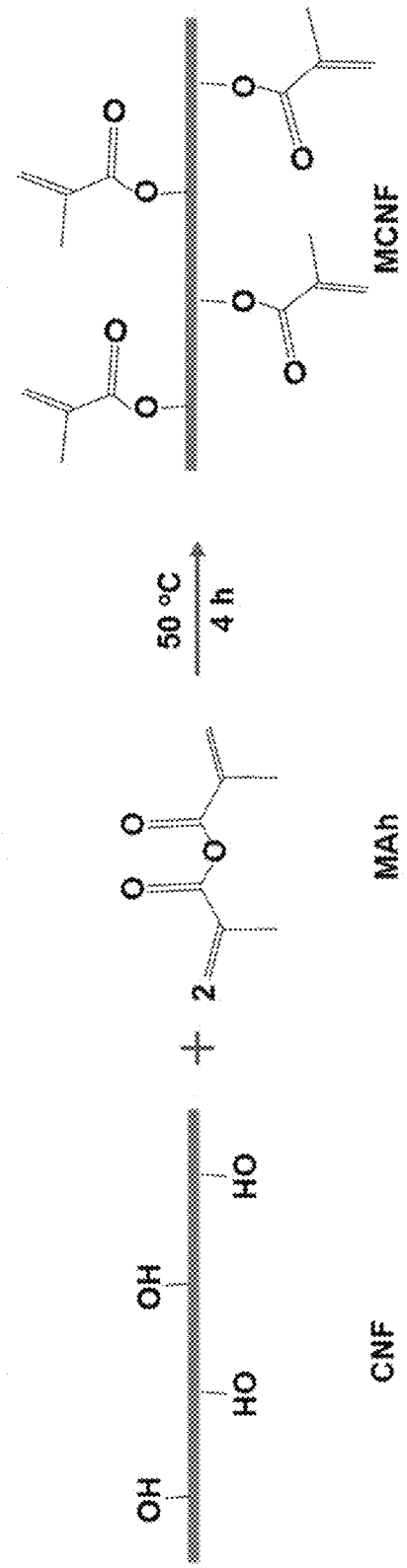
FIG. 1B shows a simplified reaction scheme for MCNF synthesis.
Figure 1C:
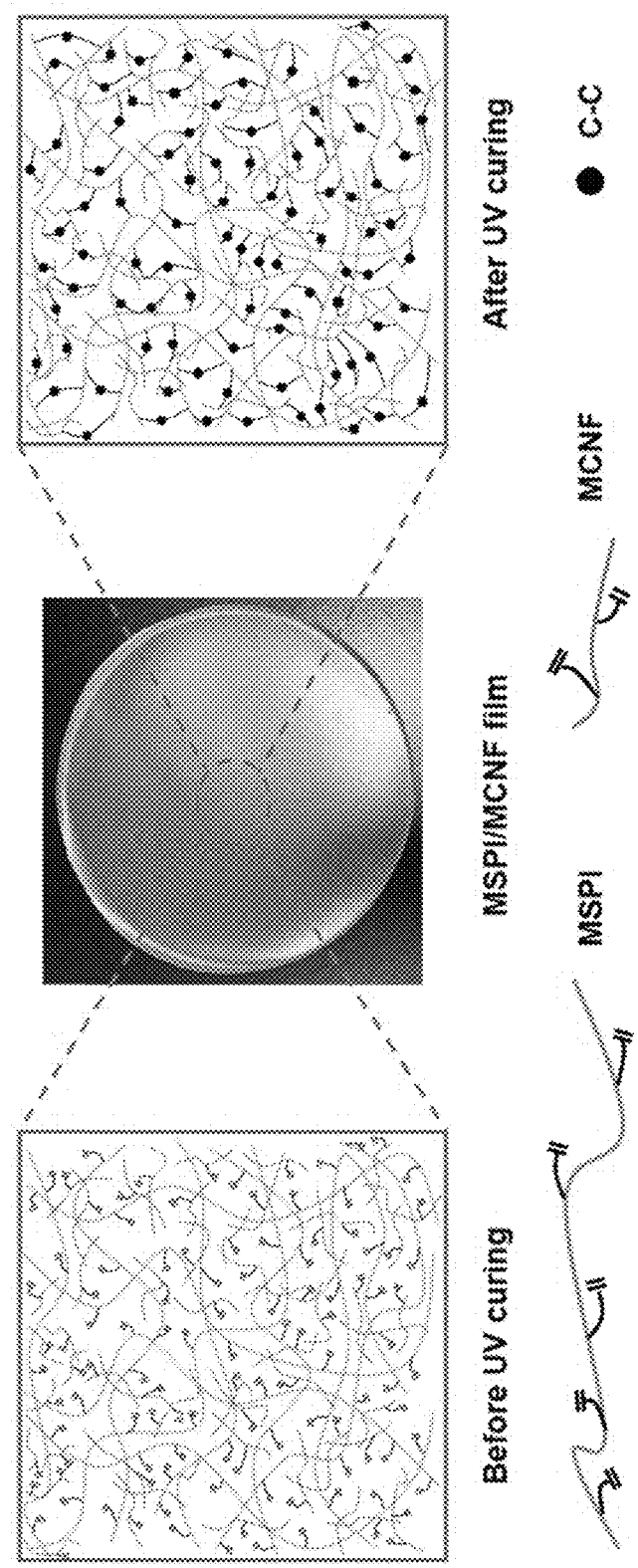
FIG. 1C shows the mechanism of MSPI/MCNF crosslinking under UV irradiation.

Example 1: Synthesis and Characterization of Macromers and Preparation of SPI Composite Films FIG. 1A and FIG. 1B show the simplified reaction schemes for methacrylation of SPI and CNF, respectively. Methacrylate groups are grafted onto the two materials through methacrylic anhydride's reactions with the amine or hydroxyl groups. FIG. 1C illustrates UV curing mechanism between MSPI and MCNF to produce crosslinked SPI films. Under UV irradiation, free radicals generated from the added photoinitiator attack the C=C bonds of the grafted methacrylate groups and induce crosslinking between the groups, eventually leading to an interpenetrated network structure (FIG. 1C).

The synthesis of MSPI was performed in two steps. First an alkaline pretreatment of SPI was carried out. Briefly, 72.88 g SPI was mixed with 437.28 g distilled water in a round bottom flask. 6.56 g KOH was dissolved in 72.88 g distilled water and then added to the SPI/water mixture in the flask to give a SPI/$H_2O$/KOH ratio of 1/7/9% (w/w). The flask was then placed in a preheated oil bath at 70° C. and the mixture was magnetically stirred at 450 rpm for 1.5 h to complete the reaction. The product was allowed to cool to room temperature naturally for about 30 min and centrifuged at 9000 rpm for 5 min to remove any undissolved SPI and impurities. In the second step, MSPI was synthesized by reacting the above alkali-treated SPI with methacrylic anhydride. Different amounts of methacrylic anhydride (6, 10, 14 wt % SPI) were added into the alkali-treated SPI solution and stirred with a magnetic stirrer at 500 rpm at room temperature for 30 min to get MSPI with different degree of methacrylation.

MCNF was synthesized by reacting CNF with methacrylic anhydride at 50° C. for 4 h. Briefly, 4 g (dry weight) of CNF were dispersed in 400 ml of deionized water using an IKA RW20 digital homogenizer (656 rpm) for 30 min at room temperature. The temperature of the colloidal suspension was increased to 50° C. and 40 g methacrylic anhydride (MAh) was added. The reaction was continued for 4 h while the pH of the suspension was maintained at 8-10 by adding 5 N NaOH solution. After that, the resulting suspension was washed with deionized water by repeated centrifugations (11000 rpm, 5 min per cycle) until the pH was 7.

Figure 2A:
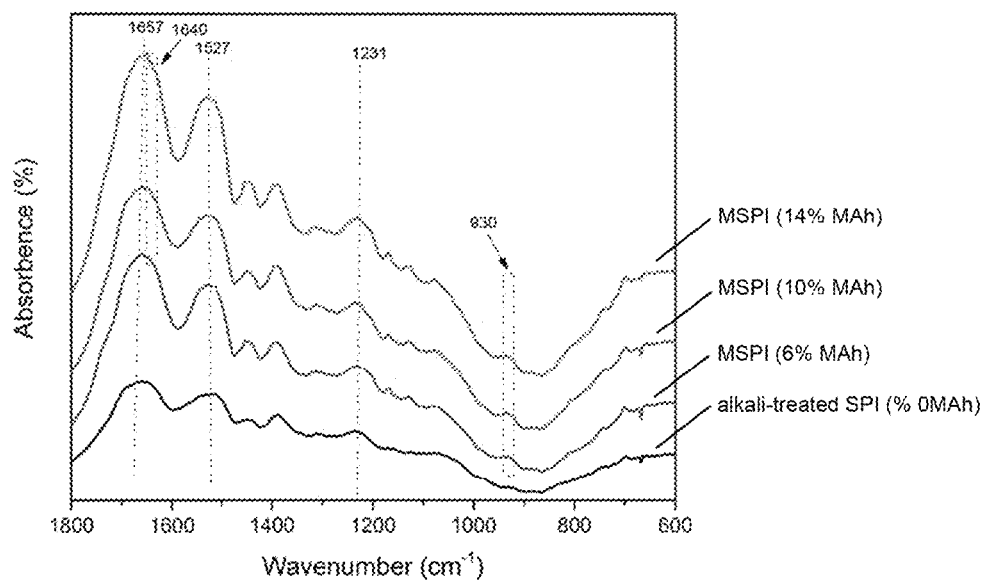
FIG. 2A shows FTIR spectra of alkali-treated SPI and MSPI.

The introduction of the methacrylate groups onto SPI and CNF is demonstrated by the FTIR spectra shown in FIG. 2. SPI showed characteristic amide bands at 1657, 1527, 1391 and 1231 cm$^{-1}$ assigned to amide I (C=O stretching), amide II (N—H bending), and amide III (C—N and N—H stretching), respectively. After the methacrylation, two new peaks appeared in all the MSPI samples at 1640 cm$^{-1}$ (C=C double bond) and 930 cm$^{-1}$ (out of plane deformation of C—H of RC=CH$_2$), indicating successful grafting of the methacrylate group.

Figure 2B:
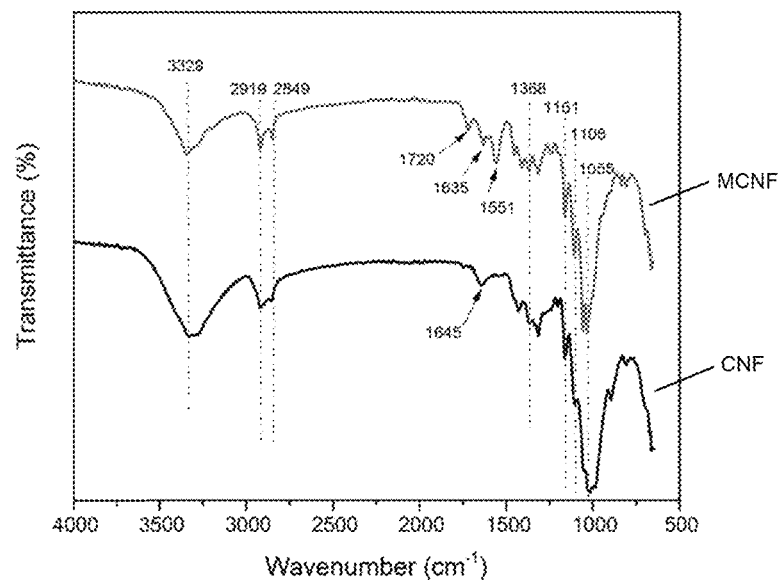
FIG. 2B shows FTIR spectra of pristine CNF and MCNF.

The FTIR spectra of CNF and MCNF are presented in FIG. 2B. Characteristic absorption peaks of CNF were observed at around 3329 cm$^{-1}$ (O—H), 2919, and 2849 cm$^{-1}$ (C—H stretching of —CH$_2$ group). Other major peaks detected included the absorption bands at 1645 cm$^{-1}$ (bound water), 1368 cm$^{-1}$ (C—H bending), 1161 cm$^{-1}$ (C—O—C stretching), 1106 cm$^{-1}$ (C—O stretching), and 1055 cm$^{-1}$ (C—O and C—C stretching). After the methacrylation, three new peaks at 1720 cm$^{-1}$ (C=O stretching), 1635 cm$^{-1}$ (C=C vibration), and 1550 cm$^{-1}$ appeared on the spectrum of MCNF. The peak at 1368 cm$^{-1}$ of MCNF also became stronger than that of CNF due to —C—CH$_3$— stretching. These results confirm the success of CNF methacrylation.

A mixture of MSPI solution, CNF or MCNF (10 wt % of dry MSPI), plasticizer (glycerol, 50 wt % of dry MSPI), and photo-initiator (PI) (2-Hydroxy-2-methylpropiophenone) (8 wt % of dry MSPI) was prepared by using an IKA T25 digital ultra-turrax homogenizer (3400 rpm) for 30 min at room temperature. After that, the mixture was poured into a polypropylene Petri dish and allowed to dry under ambient conditions for 2 days. The obtained film (thickness ~0.4 mm) was then crosslinked under a 250 W 365 nm UV lamp (20 cm distance between the lap and the sample).

Figure 3A:
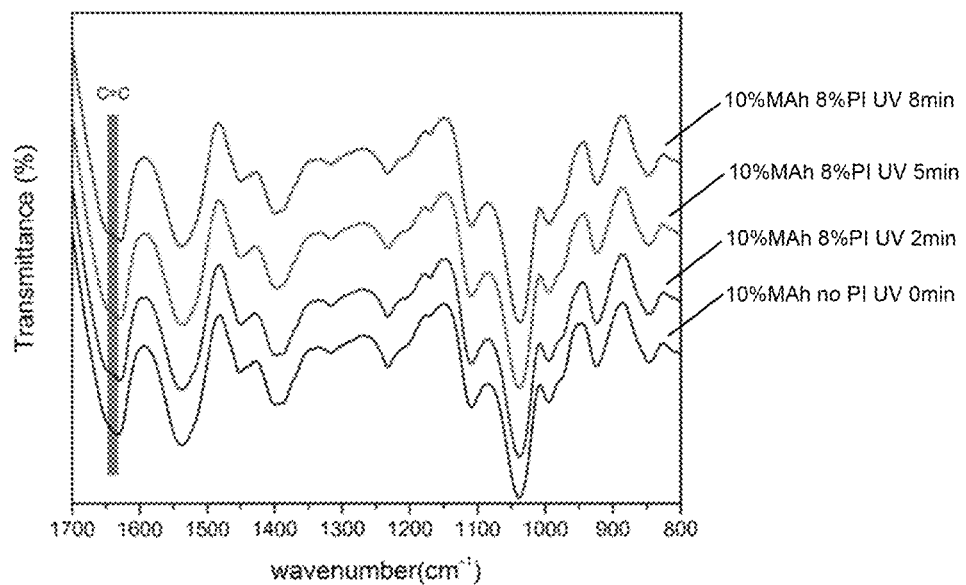
FIG. 3A shows FTIR spectra of MSPI films (methacrylated with 10 wt % MAh) after UV curing for various minutes.

UV curing of MSPI is confirmed by the consumption of C=C bonds during the crosslinking reaction and increased mechanical properties of the MSPI films after UV irradiation. FIG. 3A compares the FTIR spectra of MSPI films cured for different amount of time. The peak centered around 1630 cm$^{-1}$ is resulted from amide I and C=C vibrations. It was noted that the intensity of the region representing the C=C vibration decreased after the sample's exposure to UV irradiation, indicating complete cleavage of C=C bonds for free radical polymerization.

Figure 3B:
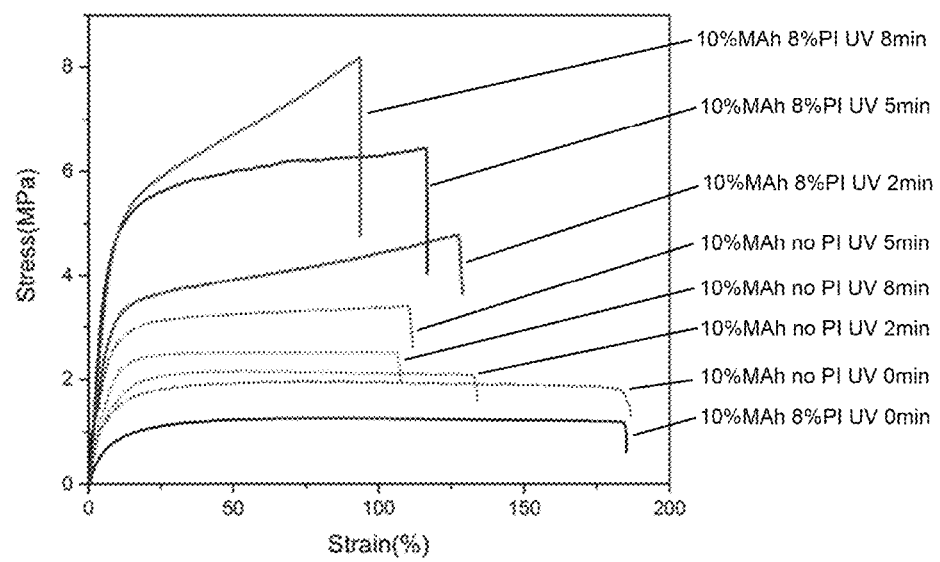
FIG. 3B shows stress-strain curves of MSPI films (methacrylated with 10 wt % MAh) after UV curing for various minutes. The films contain either no PI or 8 wt % PI for initiating UV crosslinking.

FIG. 3B shows the tensile stress-strain curves of the MSPI films. Tensile properties of the films were calculated based on the curves and the results are summarized in Table 1. The sample without undergoing UV irradiation, i.e. sample "10% MAh 8% PI UV 0 min", showed the lowest failure stress and elastic modulus and the highest failure strain among all the films, indicating that the sample is a weak, soft, flexible material without UV curing. The fracture stress and modulus of all the films, either containing PI or not, increased with the increasing curing time. For the films containing PI, the stress and modulus increased from 1.22 MPa and 16.23 MPa at 0 min UV irradiation to 8.39 MPa and 74.25 MPa at 8 min UV irradiation, respectively. For the films containing no PI, the stress and modulus increased from 1.97 MPa and 29.17 MPa to 2.59 MPa and 37.56 MPa respectively under the same conditions. The samples containing PI showed much larger property increases than the samples without PI because of the former's crosslinked molecular structures caused by the UV curing. The samples containing no PI was not able to undergo such UV curing process due to their lack of the photoinitiator. However, the heat from the UV lamp during the curing process caused temperature increases of the films, which led to heat-induced protein denaturization and thus mild improvements in film mechanical properties.

FIG. 3B shows another interesting phenomenon. For all the samples without undergoing UV curing (due to either without PI or zero UV irradiation time), a wide plateau region appeared on their tensile stress-strain curves after the initial rapid stress increases, which is a common tensile behavior for thermoplastic polymers (often called cold drawing) and is attributed to chain slip, disentanglement and alignment that occurs during the tensile process. It is this slip/disentanglement/alignment process that allows the samples to undergo large deformation under tension. By contrast, for the cured samples their stresses continued to increase after the initial rapid increases, suggesting a different material deformation mechanism (termed strain hardening). After crosslinking polymer chains are covalently connected together to form a network structure and the chain slip/disentanglement/alignment is largely inhibited. This strong network structure imparts increased resistance to sample deformation and thus leads to continuously increasing stress with the increasing strain.

TABLE 1

| Samples | Failure stress (MPa) | Failure strain (%) | Elastic modulus (MPa) |
| --- | --- | --- | --- |
| no PI UV 0 min | 1.97 ± 0.27 | 185 ± 8.56 | 29.17 ± 7.07 |
| no PI UV 2 min | 2.12 ± 0.25 | 129 ± 13.52 | 28.72 ± 1.25 |
| no PI UV 5 min | 3.33 ± 0.26 | 114 ± 20.22 | 51.56 ± 7.38 |
| no PI UV 8 min | 2.59 ± 0.16 | 113 ± 11.25 | 37.56 ± 13.72 |
| 8% PI UV 0 min | 1.22 ± 0.04 | 188 ± 13.96 | 16.23 ± 0.44 |
| 8% PI UV 2 min | 4.79 ± 0.45 | 129 ± 4.24 | 60.25 ± 14.72 |
| 8% PI UV 5 min | 6.15 ± 1.46 | 118 ± 27.50 | 93.70 ± 6.22 |
| 8% PI UV 8 min | 8.39 ± 2.12 | 91 ± 12.89 | 74.25 ± 13.28 |

Example 2: Effect of MAh Dosage

Figure 4:
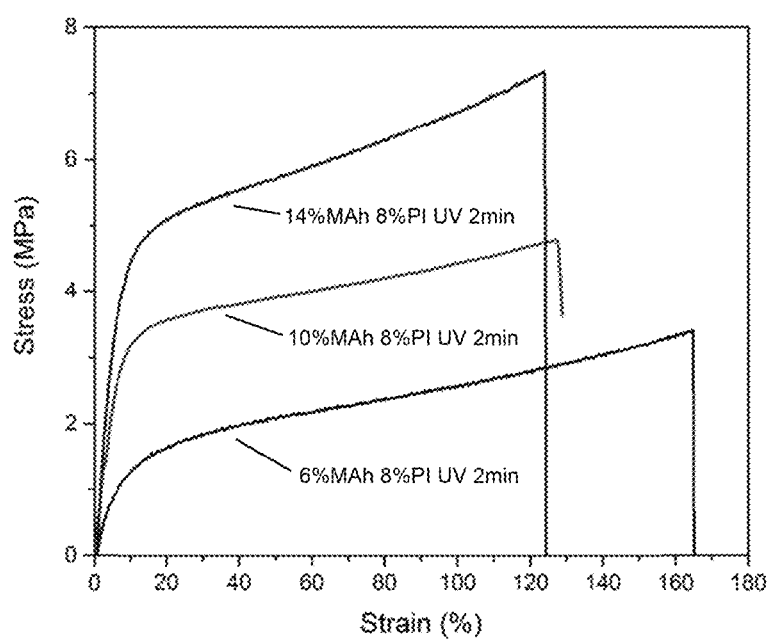
FIG. 4 shows tensile stress-strain curves of MSPI films synthesized using different contents of MAh. All samples contained 8% PI and underwent 2 min UV irradiation.

The content of MAh used to synthesize MSPI affects the number of the reactive methacrylate groups that are grafted onto SPI molecules (i.e. degree of methacrylation). The MSPI with a higher degree of methacrylation is expected to show higher crosslinking density and thus higher mechanical properties after UV curing. FIG. 4 presents the tensile stress-strain curves for the MSPI films synthesized with 6%, 10%, and 14% MAh, and the tensile property results are summarized in Table 2. Apparently, all the samples showed a strain hardening behavior due to the crosslinked polymer network. The failure stress and modulus of the samples increased with increasing MAh content. From 6% to 14% MAh, the stress and modulus increased from 3.57 MPa and 24.62 MPa to 7.37 MPa and 90.42 MPa, respectively, confirming the higher methacrylation degree and higher crosslinking density at 14% MAh. In the following sections, MSPI synthesized with 10% MAh was chosen as the matrix polymer to study the effects of CNF and MCNF on the properties of the soy plastics.

TABLE 2

| Samples | Failure stress (MPa) | Failure strain (%) | Elastic modulus (MPa) |
|---|---|---|---|
| 6% MAh 8% PI UV 2 min | 3.57 ± 0.22 | 162 ± 3.82 | 24.62 ± 1.85 |
| 10% MAh 8% PI UV 2 min | 4.79 ± 0.45 | 129 ± 4.24 | 60.25 ± 14.72 |
| 14% MAh 8% PI UV 2 min | 7.37 ± 0.06 | 121 ± 5.09 | 90.42 ± 2.25 |

Example 3: Effects of CNF and MCNF on MSPI Mechanical Properties

Figure 5A:
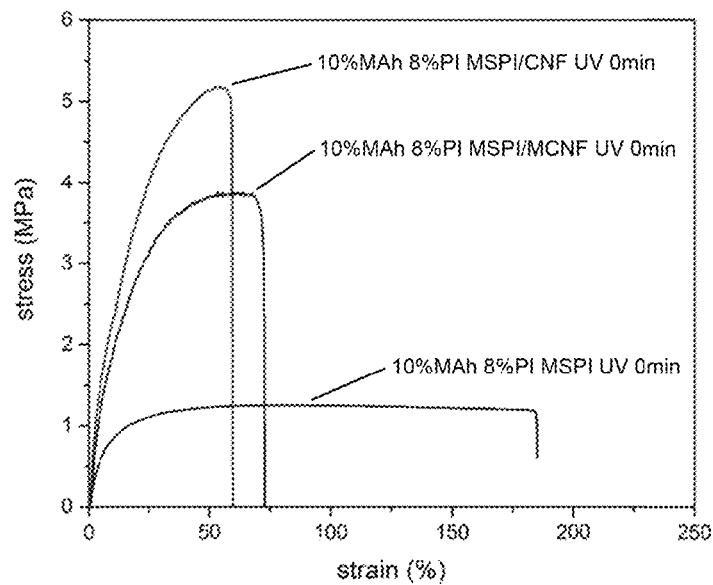
FIGS. 5A-C show tensile stress-strain curves of MSPI films reinforced by 10% CNF or MCNF. MSPI was synthesized using 10% MAh. The films were cured by UV irradiation for 0, 2 and 5 min.

The reinforcing effects of CNF and MCNF on uncured MSPI films can be clearly seen from the stress-strain curves in FIG. 5A and from the result data summarized in Table 3. Both the failure stress and modulus increased significantly after the incorporation of the two types of nanofibers while the failure strain decreased as the samples became less flexible. The increases are ascribed to the strong reinforcement effect of the cellulose nanofillers, which originates from their high mechanical properties, large aspect ratio, and strong interfacial bonding with the MSPI matrix.

The effects of CNF or MCNF on the mechanical properties of MSPI depend on multiple factors. MCNF is more hydrophobic than CNF because of the grafted methacrylate groups. It therefore shows higher compatibility with MSPI as demonstrated by its easier and better dispersion in MSPI during the mixing process. On the other hand, the methacrylation process of CNF unavoidably causes some surface and structural damages to CNF, likely leading to a shorter fiber length and a lower mechanical strength of MCNF. In addition, the MSPI/MCNF samples contain slightly more (about 1% more) photoinitiator than the MSPI/CNF samples because the former possess more methacrylate groups and hence require more photoinitiator for curing. The photoinitiator is an oily material and can function as a plasticizer in the sample before UV curing.

Without UV curing, MSPI/MCNF samples exhibit greater elongation at break and lower failure stress and lower modulus than MSPI/CNF samples possibly because of the former's higher photoinitiator content and reduced MCNF length and strength. After UV curing, the failure stress and modulus of MSPI/MCNF are more rapidly improved with the increasing curing time than those of MSPI/CNF, leading to similar stresses and muduli of the two samples at the same curing time. Moreover, the elongation at break of MSPI/MCNF is still higher than that of MSPI/CNF under the same conditions, possibly due to the better dispersion of MCNF in the MSPI matrix, which reduces the size and number of large MCNF aggregates and therefore lower the probability of premature sample fracture. The reason for the more rapid increase in failure stress and modulus for MSPI/MCNF than MSPI/CNF is because of the additional crosslinks (i.e., the links between MSPI and MCNF and those between MCNF and MCNF) that are enabled by the grafted methacrylate groups of MCNF.

TABLE 3

| | Samples | Failure stress (MPa) | Failure strain (%) | Elastic modulus (MPa) |
|---|---|---|---|---|
| UV 0 min | MSPI | 1.22 ± 0.04 | 188 ± 13.96 | 16.23 ± 0.44 |
| | MSPI/CNF | 5.15 ± 0.04 | 59.95 ± 0.50 | 42.85 ± 3.45 |
| | MSPI/MCNF | 3.76 ± 0.16 | 74.06 ± 4.64 | 37.65 ± 1.62 |
| UV 2 min | MSPI | 4.79 ± 0.45 | 129 ± 4.24 | 60.25 ± 14.72 |
| | MSPI/CNF | 8.80 ± 0.75 | 59.27 ± 2.51 | 90.16 ± 1.42 |
| | MSPI/MCNF | 8.10 ± 0.90 | 83.25 ± 6.02 | 96.62 ± 6.42 |
| UV 5 min | MSPI | 6.15 ± 1.46 | 118 ± 27.50 | 93.70 ± 6.22 |
| | MSPI/CNF | 12.52 ± 0.87 | 46.74 ± 9.48 | 134.81 ± 11.85 |
| | MSPI/MCNF | 12.11 ± 0.61 | 58.34 ± 2.79 | 127.39 ± 20.44 |

Example 4: Water Resistance

Figure 6A:
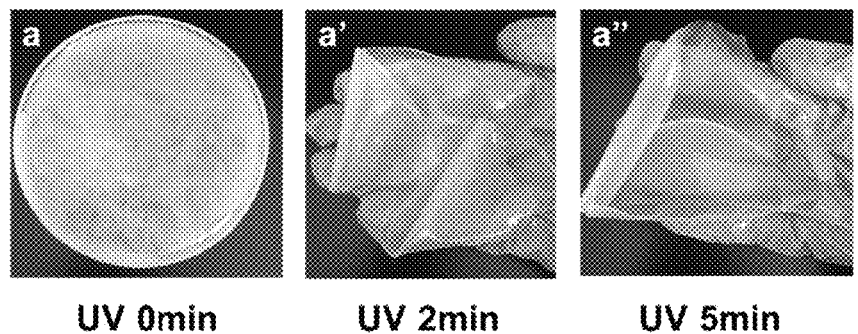
FIG. 6A shows images of MSPI films after 8 hours of water immersion. MSPI was synthesized using 10% MAh.
Figure 6B:
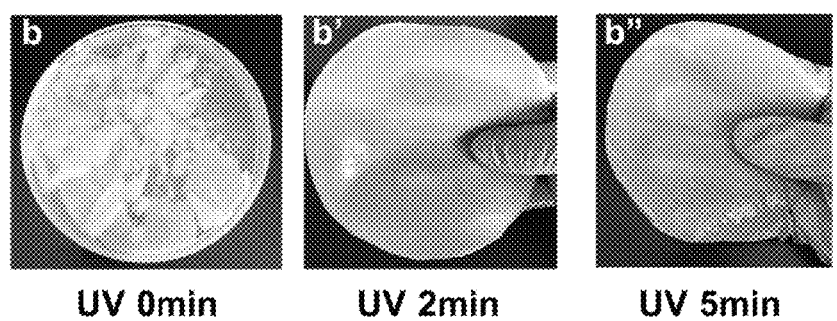
FIG. 6B shows images of MSPI/CNF films after 8 hours of water immersion. MSPI was synthesized using 10% MAh.
Figure 6C:
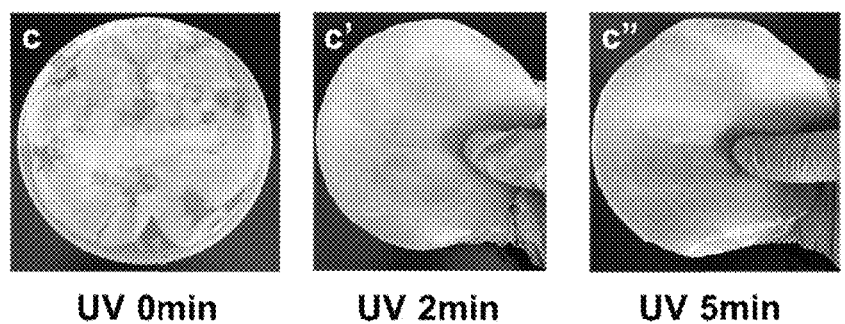
FIG. 6C shows images MSPI/MCNF films after 8 hours of water immersion. The content of CNF or MCNF is 10%.

In order to examine the water resistance of the MSPI films after UV curing, tensile properties of the samples after 8 hours water immersion were measured. Images of the samples after 8 hours of water immersion are provided in FIG. 6. All the uncured samples (UV 0 min) broke apart into small pieces during the immersion test, regardless of the incorporation of CNF or MCNF. Therefore, the nanofibers alone cannot increase the water resistance of the films. For the samples cured for 2 min, the one without any nanofibers (FIG. 6A) broke apart into several large pieces while the ones with the nanofibers (FIGS. 6B and 6C) were able to maintain their structural integrity, indicating the nanofibers' effect on the improvement of film water resistance. This effect can be attributed to the spanning nanofiber network present in the films that holds the materials together.

Curing time also played a factor in sample water resistance. The samples incorporated with CNF or MCNF showed less swelling after 5 min curing than after 2 min curing. A longer curing time led to a higher crosslinking density, causing a more tightly packed structure which allowed less water ingression and swelling. Moreover, comparing b' and c' reveals that the sample incorporated with MCNF showed less swelling than the sample incorporated with CNF, which can be attributed to the strong covalent bonding between MCNF and MSPI, higher hydrophobicity of MCNF compared with CNF, and better dispersion of MCNF in MSPI.

Figure 5B:
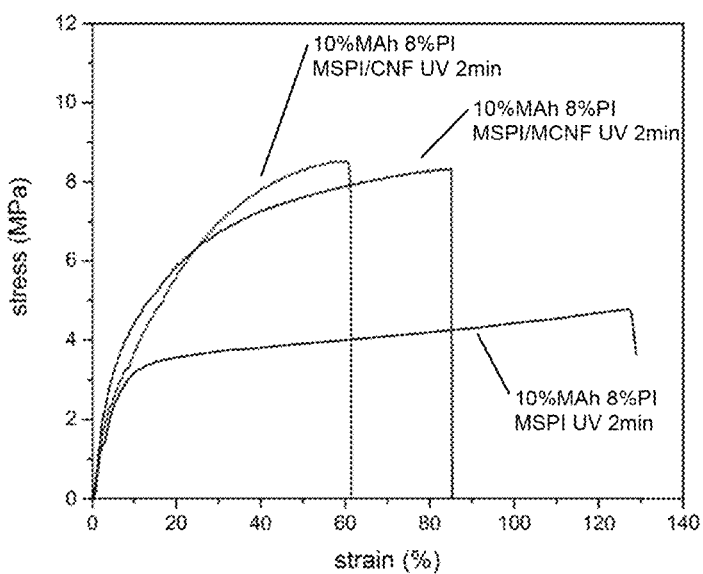
Figure 5C:
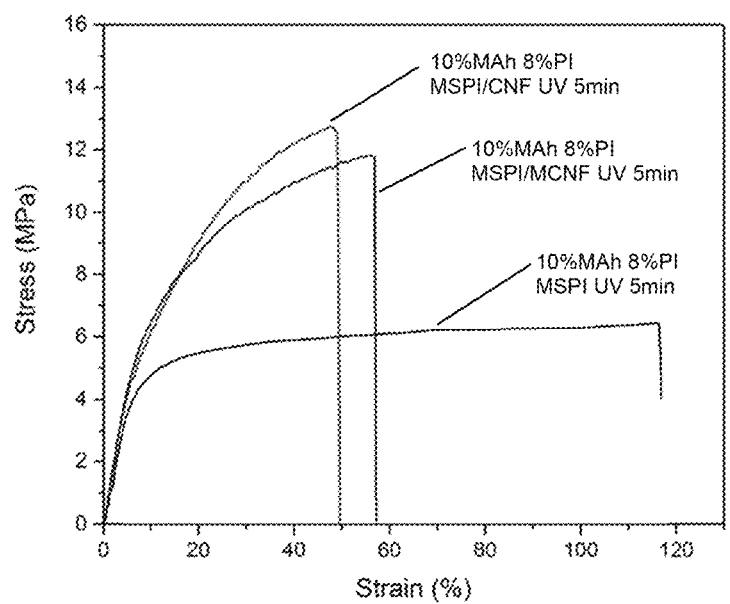
Figure 7:
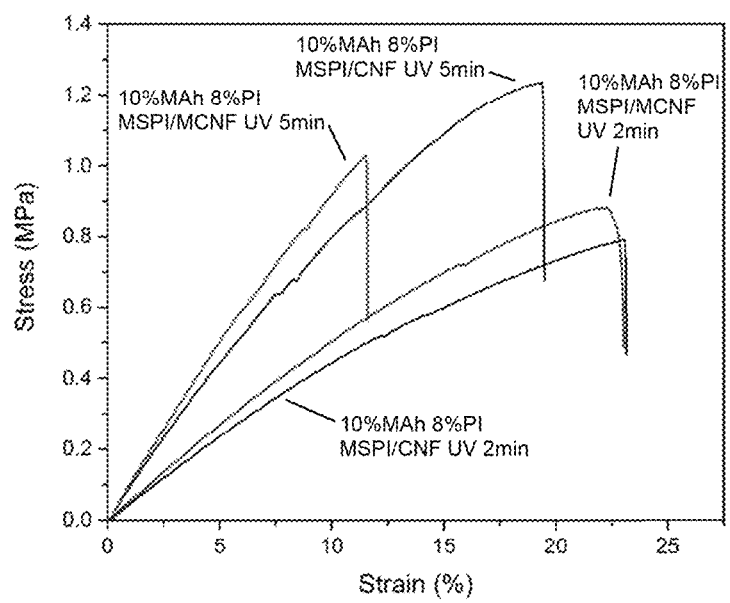
FIG. 7 shows tensile stress-strain curves of MSPI films reinforced with 10% CNF or MCNF. The films were tested after 8 hours water immersion. MSPI was synthesized using 10% MAh. All films contain 8% PI.

FIG. 7 shows the tensile stress-strain curves of the films after 8 hours of water immersion and the properties are summarized in Table 5. Compared with the tensile results for the dry samples (FIG. 5 and Table 3), the failure stress, failure strain and elastic modulus of the water treated samples all decreased substantially. The decreases are understandable because the water treated samples contained large contents of water, which functioned as a plasticizer to separate polymer chains and reduce their interactions, and thus weaken the materials. It is also possible that some components of the films, e.g. unreacted soy protein molecules, leached out the samples during the immersion, further weakening the films. Similar to the dry films, a longer curing time led to a higher fracture stress and modulus but a lower fracture strain for the wet samples, due to their increased crosslinking density.

TABLE 4

| | Samples | Failure stress (MPa) | Failure strain (%) | Elastic modulus (MPa) |
|---|---|---|---|---|
| UV 2 min | MSPI/CNF | 0.78 ± 0.08 | 25.06 ± 1.72 | 5.37 ± 1.04 |
| | MSPI/MCNF | 0.88 ± 0.07 | 23.04 ± 3.70 | 6.12 ± 1.07 |
| UV 5 min | MSPI/CNF | 1.23 ± 0.18 | 20.11 ± 0.11 | 9.92 ± 1.09 |
| | MSPI/MCNF | 1.03 ± 0.19 | 11.61 ± 1.50 | 11.04 ± 0.95 |

In this study we developed a technique that combines the advantages of UV curing and nanofiber reinforcement to obtain UV curable soy plastics that exhibit greatly enhanced mechanical strength and water resistance. Surface-modified, UV curable MSPI and MCNF were prepared by methacrylation of SPI and CNF, respectively. FTIR and tensile test results confirmed successful methacrylation of the two materials and UV curability of the MSPI films. UV exposure time and the degree of methacrylation of MSPI were shown to have significant effects on the mechanical properties of the films. Longer exposure time and higher methacrylation degree led to higher sample tensile strength and modulus but lower ductility because of higher crosslinking density of the sample. The incorporation of CNF or MCNF into MSPI further improved its mechanical properties because of the superior reinforcement effect of CNF and MCNF. Compared with CNF reinforced samples, MCNF reinforced samples exhibited greater elongation at break and similar failure stress and modulus. The incorporation of CNF or MCNF and UV curing show significant synergy in improving mechanical strength and water resistance of the soy plastics through reinforcing the materials and forming MSPI network structure. MCNF performs better than CNF in this regard because MCNF is reactive and can form crosslinks with MSPI. The synergistic effect of photo-crosslinking and cellulose nanofiber reinforcement discovered in this study provides a novel, facile, effective method to improve the mechanical and water resistance performance of soy plastics. This technique has great economic and environmental benefits as it solves one of the most difficult issues facing current soy plastics and thus can potentially expand their market.

Examples 5: Applications of the Soy-Based Resins in 3D Printing

Resin Formulations

Two MSPI-based resins were formulated for fused deposition modeling (FDM) 3D printing. The two formulations are given in Table 5.

TABLE 5

| Resins | MSPI (phr) | AESO (phr) | PEO (phr) | GDMA (phr) | CNF (phr) | PI (phr) | Solid Content |
|---|---|---|---|---|---|---|---|
| MSPI-1 | 100 | 40 | | | 10 | 8.4 | about 34 wt % |
| MSPI-2 | 100 | | 21 | 50 | 10 | 10.26 | |

PI: photo initiator

3D Printing

Figure 8A:
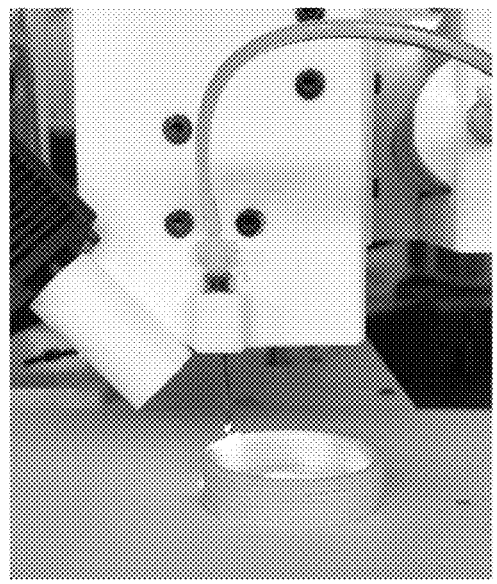
FIG. 8A shows MSPI based resin being printed into a flower pot.
Figure 8B:
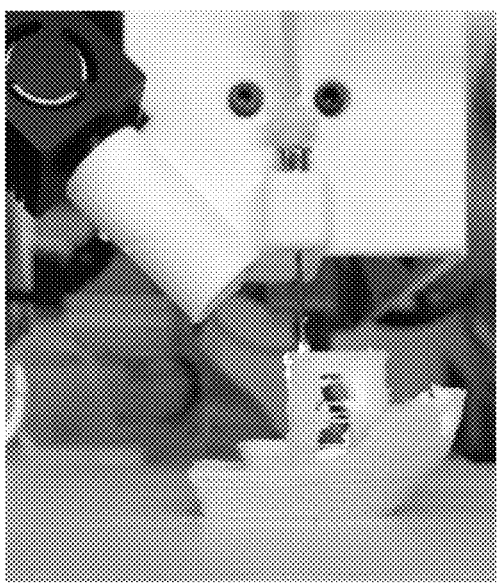
FIG. 8B shows MSPI based resin being printed into a 3D Benchy.
Figure 8C:
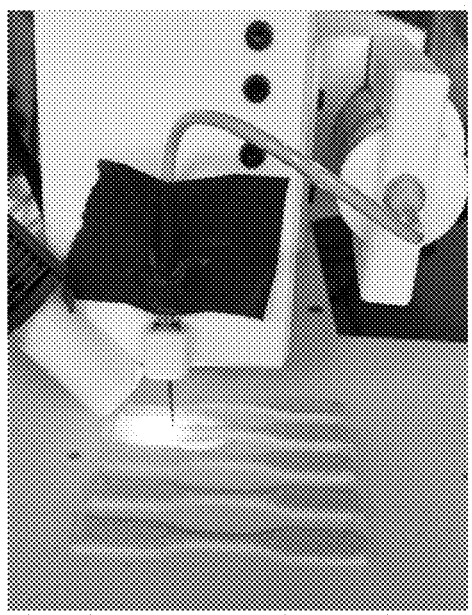
FIG. 8C shows MSPI based resin being printed into tensile specimens.
Figure 9A:
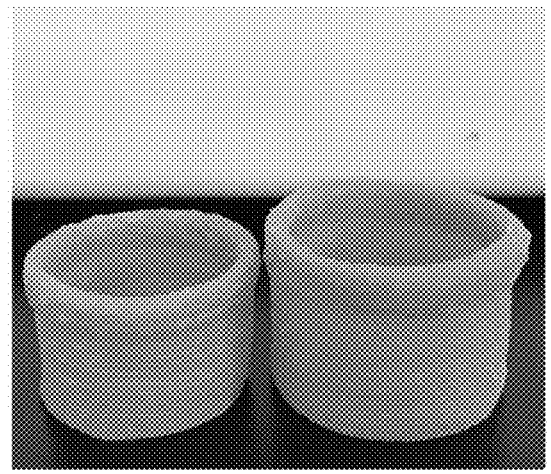
FIG. 9A is a photo of the flower pots printed using MSPI-2.
Figure 9B:
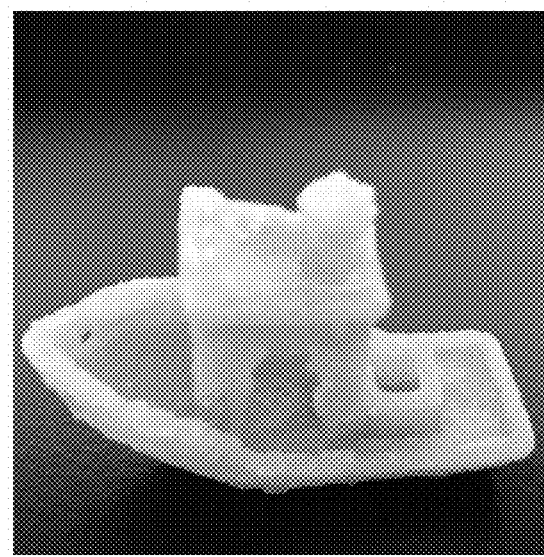
FIG. 9B is a photo of the 3D Benchy printed using MSPI-1.

FIGS. 8A and 8B demonstrate the printing of a flowerpot and a 3D Benchy. The resin was partially cured while being deposited on the printing bed using a UV spotlight, which tracked the nozzle tip. After printing, the products were air-dried for 2 h on the printing bed, followed by post-curing under a UV lamp. The fully cured products were then dried overnight at 60° C. in a vacuum oven. The photos of the final products are shown in FIG. 9.

Confirmation of UV Curing

Figure 10A:
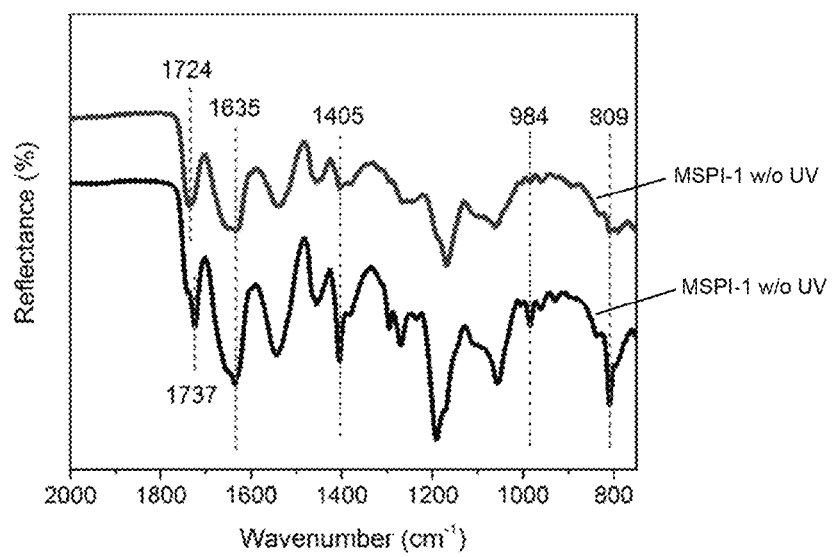
FIG. 10A shows FTIR spectra of uncured and cured MSPI-1 resins.
Figure 10B:
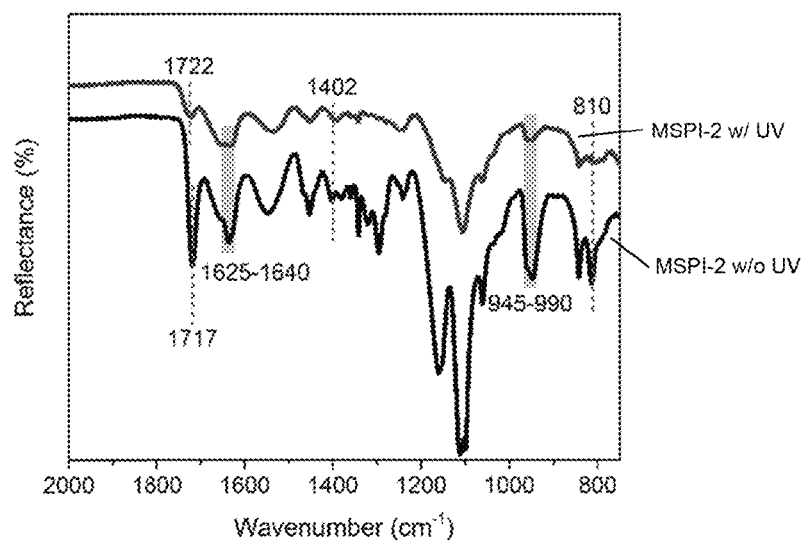
FIG. 10B shows FTIR spectra of uncured and cured MSPI-2 resins.
Figure 11A:
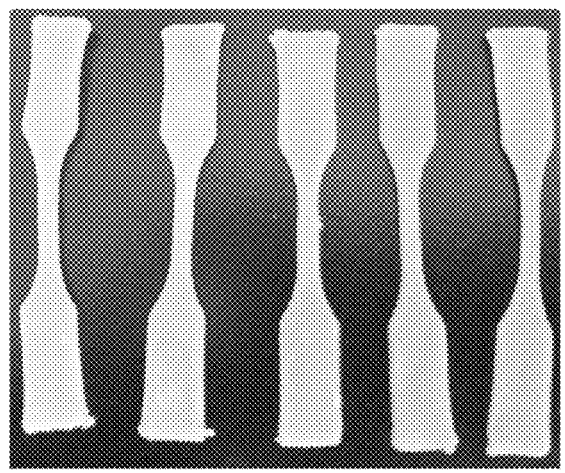
FIGS. 11A-D show pictures of the dry and wet (after 24 h water immersion) tensile specimens printed from MSPI-1 and MSPI-2.
Figure 11B:
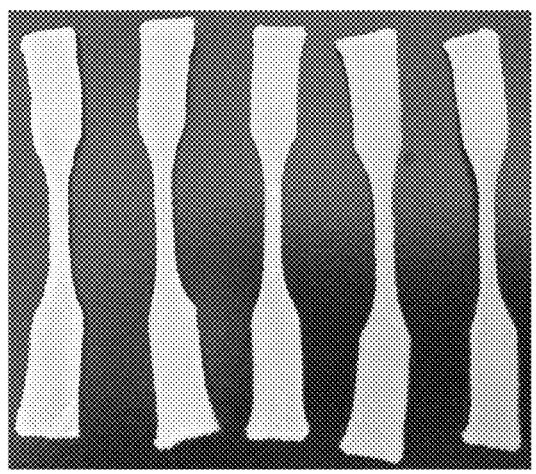
Figure 11C:
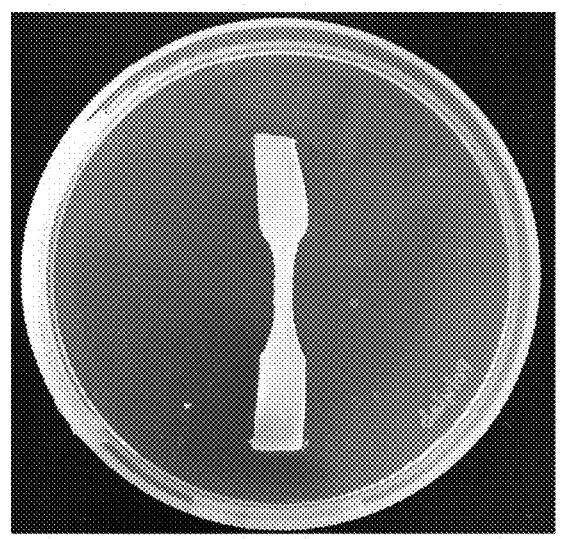
Figure 11D:
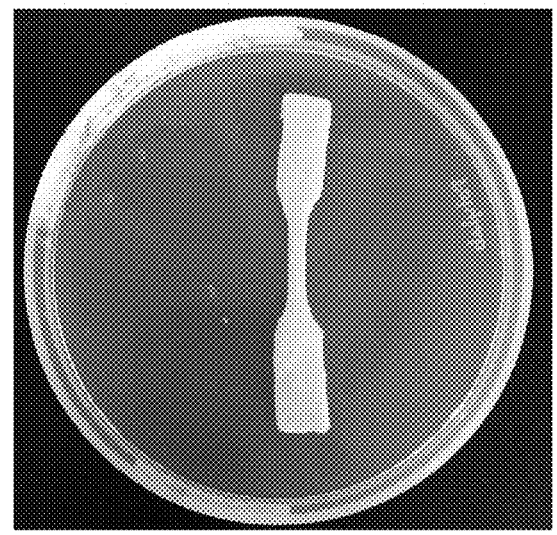

The curing of the two MSPI-based resins was monitored by Fourier transform infrared spectroscopy (FTIR). FIG. 10 shows the FTIR spectra of the two resins before and after UV curing. In FIG. 10A, the band at 1724 cm$^{-1}$ of the uncured MSPI-1 resin is attributed to C=O of the acrylate group of AESO. The band at 1635 cm$^{-1}$ is attributed to the overlap of amide I of MSPI and C=C stretching of the methacrylate group of MSPI and the acrylate group of AESO. The band at 1405 cm$^{-1}$ is attributed to the overlap of the C—O—H group of MSPI and CNF and C=C scissoring of the acrylate group of AESO. The band at 985 cm$^{-1}$ is attributed to the overlap of C—O stretching of MSPI and CNF and C=C out of plane bending of the acrylate group of AESO. The band at 809 cm$^{-1}$ is attributed to C=C out of plane bending of the acrylate group of AESO. In the cured MSPI-1, the intensity of the peaks at 1635, 1405, 985, 809 cm$^{-1}$ decreased significantly due to the consumption of the C=C bonds of the acrylate and methacrylate moieties. Moreover, the C=O stretching shifted to a higher frequency at 1737 cm$^{-1}$ due to the weakening of the conjugation between C=O and C=C caused by the disappearance of C=C stretching. These results confirmed the UV curing of the resin. Similar results for MSPI-2 can be seen from FIG. 10B. The band at 1717 cm$^{-1}$ of the uncured MSPI-2 resin is attributed to C=O of the methacrylate group of GDMA. The band at 1625~1640 cm$^{-1}$ is attributed to the overlap of amide I of MSPI and C=C stretching of the methacrylate group of MSPI and GDMA. The band at 1402 cm$^{-1}$ is attributed to the overlap of the C—O—H group of MSPI and CNF as well as C=C scissoring of the methacrylate group of GDMA. The band at 945~990 cm$^{-1}$ is attributed to the overlap of C—O stretching of MSPI and CNF, CH$_2$ stretching of PEO, and C=C out of plane bending of the methacrylate group of GDMA. The band at 810 cm$^{-1}$ is attributed to C=C out of plane bending of the methacrylate group of GDMA. In the cured MSPI-2, the C=O stretching also shifted to the higher frequency at 1722 cm$^{-1}$, and the intensity of the peaks at 1625~1640 cm$^{-1}$, 1405, 945~990 cm$^{-1}$, and 810 cm$^{-1}$ showed significant decreases. For the decrease in peak intensity at 945~990 cm$^{-1}$, in addition to the consumption of the C=C bonds of the methacrylate moieties, weak crosslinking of PEO resulted from hydrogen abstraction during UV irradiation might also contribute to this observation.

Mechanical Properties and Water Resistance of the Products

Figure 12A:
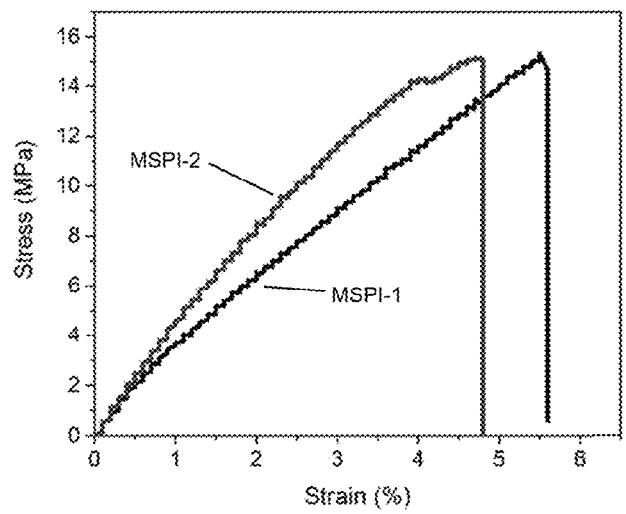
FIG. 12A shows tensile stress-strain curves of dry tensile specimens printed from MSPI-1 and MSPI-2.
Figure 12B:
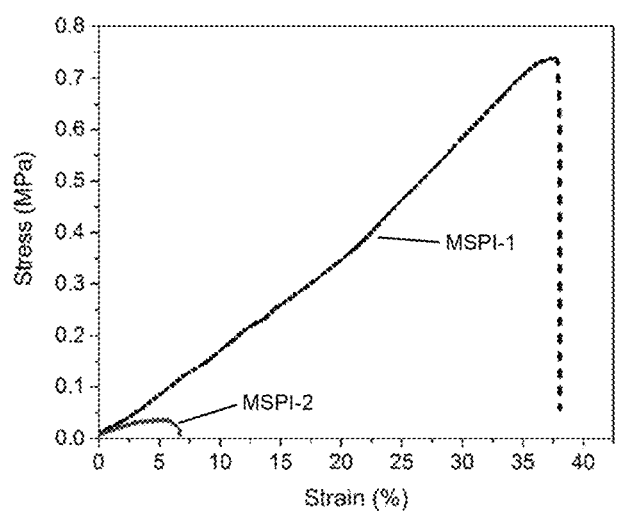
FIG. 12B shows tensile stress-strain curves of wet (after 24 h water immersion) tensile specimens printed from MSPI-1 and MSPI-2.

FIG. 11 shows the pictures of the dry and wet (after 24 h water immersion) tensile specimens printed from MSPI-1 and MSPI-2. The dry and wet tensile properties of the specimens are shown using their representative stress-strain curves (FIG. 12) and the property data in Table 6. MSPI-1 and MSPI-2 demonstrated similar dry tensile properties, with MSPI-1 exhibiting a tensile stress of 15.11 MPa, a modulus of 423.47 MPa, and a strain at break of 5.90%, whereas MSPI-2 showing a tensile stress of 15.52 MPa, a modulus of 422.68 MPa, and a strain at break of 5.23%. After 24 h water immersion, the specimens from both formulations maintained their structural integrity (FIG. 11) and were strong enough to be subjected to the tensile test. Wet MSPI-2 demonstrated a tensile stress of 0.04 MPa, a modulus of 1.06 MPa, and a strain at break of 6.69%. Compared with MSPI-2, MSPI-1 exhibited improved wet tensile properties, with the three properties being increased to 0.6 MPa, 1.36 MPa, and 37.48% respectively. MSPI-1's better water resistance than MSPI-2 can be attributed to its more densely crosslinked polymer network structure. The weak crosslinking of PEO gave rise to a lower crosslinking density of MSPI-2.

TABLE 6

| Samples | Tensile strength (MPa) | Strain at break (%) | Young's modulus (MPa) |
|---|---|---|---|
| MSPI-1 (dry) | 15.11 ± 1.93 | 5.90 ± 1.01 | 423.47 ± 80.98 |
| MSPI-2 (dry) | 15.52 ± 2.80 | 5.23 ± 1.02 | 422.68 ± 128.34 |

TABLE 6-continued

| Samples | Tensile strength (MPa) | Strain at break (%) | Young's modulus (MPa) |
| --- | --- | --- | --- |
| MSPI-1 (wet) | 0.6 ± 0.29 | 37.48 ± 6.62 | 1.36 ± 0.55 |
| MSPI-2 (wet) | 0.04 ± 0.01 | 6.69 ± 2.23 | 1.06 ± 0.14 |

Example 6: Thermal Curing and Combined UV-Thermal Curing of the Soy Resin

Based on the above tensile test results, MSPI-1 was selected to study the effect of thermal curing and the combined UV-thermal curing processes on product mechanical performance and water resistance. Dry and wet mechanical properties of the 3D printed samples that were uncured, UV cured, thermally cured, and UV/thermally cured were compared. Sample codes and their formulations and curing methods are provided in Table 7. All samples were dried overnight at 100° C. in a vacuum oven (the samples containing a thermal initiator would undergo thermal curing in this step) to ensure that all samples had the same thermal history.

TABLE 7

| Samples | MSPI (phr) | AESO (phr) | CNF (phr) | PI (phr) | TI (phr) | Curing |
| --- | --- | --- | --- | --- | --- | --- |
| MSPI-3 | 100 | 40 | 1 | 8.4 | 3.5 | UV/thermal cure |
| MSPI-4 | 100 | 40 | 1 | 8.4 | | UV cure |
| MSPI-5 | 100 | 40 | 1 | | 3.5 | Thermal cure |
| MSPI-6 | 100 | 40 | 1 | | | Uncured |

PI: photo initiator;
TI: thermal initiator

Figure 13A:
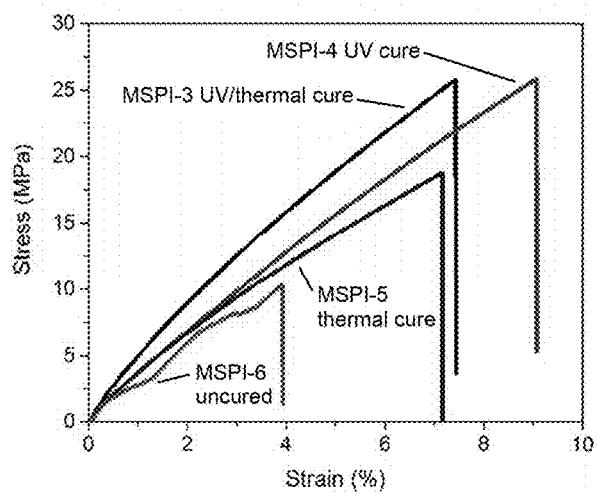
FIG. 13A shows tensile stress-strain curves of dry 3D printed samples that underwent different treatments.
Figure 13B:
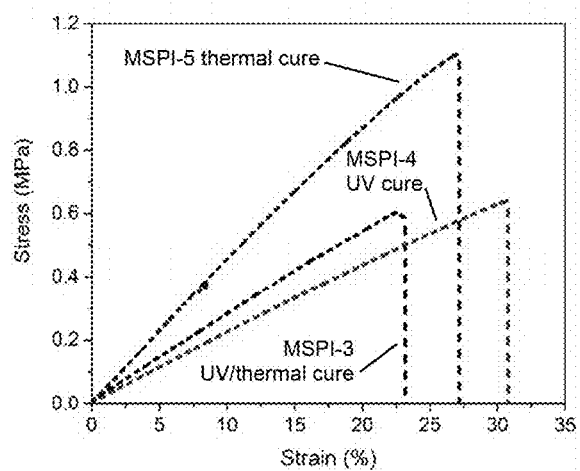
FIG. 13B shows tensile stress-strain curves of wet (24 h water immersion) 3D printed samples that underwent different treatments.

The representative tensile stress-strain curves of the samples are shown in FIG. 13 and their property data are summarized in Table 8. The uncured sample (MSPI-6) showed the lowest dry mechanical properties among all the samples, with its strength, modulus, and strain at failure being 9.59 MPa, 466.31 MPa, and 4.42%, respectively. In the wet state, the sample was so swollen and structurally unstable that it could not be subjected to the tensile test. Both UV curing and thermal curing led to evidently improved mechanical properties and water resistance, indicating that crosslinked chain structures were obtained through either UV curing or thermal curing mechanisms. In the dry state, the UV cured sample showed higher strength (23.45 MPa vs 17.04 MPa) but lower modulus (486.56 MPa vs 521.84 MPa) than the thermally cured sample. During 3D printing, UV cures the top surface of the soy resin that has just been deposited on the print bed. This curing somewhat hinders the fusion between the printed layer and the layer printed on top of it, which can lead to weakened inter-layer adhesion of the prints. This can explain why the UV cured sample showed the lowest wet strength and modulus while the thermally cured samples showed the highest. The combination of UV and thermal curing yielded the best overall dry and wet mechanical properties. In the dry state, the UV/thermal dual-cured sample showed the highest strength (23.94 MPa) and modulus (651.88 MPa). In the wet state, it also showed a higher modulus (3.05 MPa vs 2.17 MPa) than the UV cured sample. In summary, both UV curing and thermal curing can effectively cure the soy resin developed in this research. The UV/thermal dual-cure method led to the best overall performance of the soy resin.

TABLE 8

| Samples | Tensile strength (MPa) | Strain at break (%) | Young's modulus (MPa) |
| --- | --- | --- | --- |
| MSPI-3 (dry) | 23.94 ± 2.75 | 7.30 ± 0.54 | 651.88 ± 50.85 |
| MSPI-4 (dry) | 23.45 ± 2.95 | 9.50 ± 1.30 | 486.56 ± 14.97 |
| MSPI-5 (dry) | 17.04 ± 2.86 | 7.35 ± 1.40 | 521.84 ± 18.71 |
| MSPI-6 (dry) | 9.59 ± 1.02 | 4.42 ± 0.69 | 466.31 ± 41.80 |
| MSPI-3 (wet) | 0.64 ± 0.14 | 25.25 ± 4.47 | 3.05 ± 0.48 |
| MSPI-4 (wet) | 0.62 ± 0.11 | 31.22 ± 2.84 | 2.17 ± 0.34 |
| MSPI-5 (wet) | 1.12 ± 0.17 | 29.13 ± 6.77 | 4.94 ± 0.44 |

What is claimed is:

1. A biodegradable protein-based resin composition comprising:
    methacrylated or acrylated protein;
    a strengthening agent;
    a plasticizer; and
    an initiator, wherein the initiator is a photoinitiator or a thermal initiator.

2. The composition of claim 1, wherein the protein is soy protein selected from soy flour, soy protein concentrate, soy protein isolate, or a mixture thereof.

3. The composition of claim 1, wherein the protein is soy protein isolate.

4. The composition of claim 1, wherein the strengthening agent is selected from nanocellulose, carbon fiber, graphene, glass fiber, carbon nanotubes, zinc oxide, titanium dioxide, layered silicates, and nanoclay, or methacrylated or acrylated derivatives thereof.

5. The composition of claim 1, wherein the strengthening agent comprises a nanocellulose or methacrylated or acrylated nanocellulose.

6. The composition of claim 1, wherein the composition further comprises a crosslinking agent, wherein the crosslinking agent comprises one or more acrylate or methacrylate groups.

7. The composition of claim 1, wherein the photoinitiator comprises 2-hydroxy-2-methylpropiophenone.

8. The composition of claim 1, wherein the plasticizer comprises glycerol, polyethylene oxide, or acrylated-epoxidized soybean oil.

9. The composition of claim 1, wherein the composition is UV or thermal curable.

10. The composition of claim 1, wherein the composition further comprises one of more additives selected from a lubricant, a coloring agent, and a preservative.

11. A solid biodegradable article formed from the composition of claim 1.

12. The article of claim 11, wherein the article is formed by injection molding, extrusion molding, or 3D printing.

13. A method of preparing a biodegradable protein-based plastic composition comprising:
    combining methacrylated or acrylated protein, a strengthening agent, a plasticizer, and an initiator to form a mixture, wherein the initiator is a photoinitiator or a thermal initiator; and
    exposing the mixture to UV light or heat to cure the composition.

14. The method of claim 13, wherein the protein is soy protein selected from soy flour, soy protein isolate, and soy protein concentrate.

15. The method of claim 13, wherein the strengthening agent is selected from nanocellulose, carbon fiber, graphene, glass fiber, carbon nanotubes, zinc oxide, titanium dioxide, layered silicates, and nanoclay, or methacrylated or acrylated derivatives thereof.

16. The method of claim 13, wherein the strengthening agent comprises a nanocellulose or methacrylated or acrylated nanocellulose.

17. The method of claim 13, wherein the photoinitiator comprises 2-hydroxy-2-methylpropiophenone.

18. The method of claim 13, wherein the plasticizer comprises glycerol, polyethylene oxide, or acrylated-epoxidized soybean oil.

19. The method of claim 13, wherein the method further comprises forming a biodegradable article from the mixture.

20. The method of claim 19, wherein the forming is by injection molding, extrusion molding, or 3D printing.

* * * * *